United States Patent
Tohki et al.

(10) Patent No.: US 9,560,225 B2
(45) Date of Patent: *Jan. 31, 2017

(54) IMAGE FORMING APPARATUS

(71) Applicant: Sharp Kabushiki Kaisha, Osaka-shi, Osaka (JP)

(72) Inventors: Shinsaku Tohki, Osaka (JP); Makoto Okumura, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/934,399

(22) Filed: Nov. 6, 2015

(65) Prior Publication Data

US 2016/0065765 A1    Mar. 3, 2016

Related U.S. Application Data

(63) Continuation of application No. 14/598,988, filed on Jan. 16, 2015, now Pat. No. 9,210,282, which is a
(Continued)

(30) Foreign Application Priority Data

Oct. 20, 2010  (JP) ................................. 2010-235871

(51) Int. Cl.
*G06F 15/00* (2006.01)
*G06T 1/00* (2006.01)
(Continued)

(52) U.S. Cl.
CPC ........ *H04N 1/00474* (2013.01); *G03G 15/502* (2013.01); *G03G 15/5087* (2013.01); *H04N 1/00392* (2013.01); *H04N 1/00411* (2013.01); *H04N 1/00437* (2013.01); *H04N 1/00482* (2013.01); *G03G 2215/00109* (2013.01);
(Continued)

(58) Field of Classification Search
CPC ............ G06T 1/20; G06T 15/005; G06T 1/60; G09G 5/363
See application file for complete search history.

(56) References Cited

U.S. PATENT DOCUMENTS 5,081,699 A * 1/1992 Filion .................... G03G 15/50
                                                      358/1.18
5,604,860 A * 2/1997 McLaughlin ......... G06F 3/0483
                                                      715/810

OTHER PUBLICATIONS

Tohki et al., "Image Forming Apparatus", U.S. Appl. No. 14/598,988, filed Jan. 16, 2015.

* cited by examiner

*Primary Examiner* — Abderrahim Merouan
(74) *Attorney, Agent, or Firm* — Keating & Bennett, LLP

(57) ABSTRACT

An image display operation device includes a function selecting portion to correlate with a plurality of functions so as to be executable, a display portion to display the function selecting portion, and a display control portion that causes the display portion to display the function selecting portion. The function selecting portion includes a first function selecting portion in which selectable function items are displayed, and a second function selecting portion in which other function items that are selectable in conjunction with functions included in the first function selecting portion are displayed. When one or more functions included in the first function selecting portion are selected, the display control portion changes function items to be displayed on the second function selecting portion, based on contents of the one or more functions selected on the first function selecting portion.

11 Claims, 22 Drawing Sheets

Related U.S. Application Data continuation of application No. 13/274,595, filed on Oct. 17, 2011, now Pat. No. 8,970,856.

(51) Int. Cl.
  *H04N 1/00* (2006.01)
  *G03G 15/00* (2006.01)
  *G06K 15/00* (2006.01)
  *G06K 15/02* (2006.01)
  *G06F 3/12* (2006.01)
  *G06T 15/00* (2011.01)
  *G06T 1/60* (2006.01)
  *G06T 1/20* (2006.01)
  *G09G 5/36* (2006.01)

(52) U.S. Cl.
  CPC .......... *G06F 3/1296* (2013.01); *G06F 3/1297* (2013.01); *G06K 15/00* (2013.01); *G06K 15/02* (2013.01); *G06T 1/20* (2013.01); *G06T 1/60* (2013.01); *G06T 15/005* (2013.01); *G09G 5/363* (2013.01); *H04N 2201/0082* (2013.01); *H04N 2201/0094* (2013.01)

FIG. 9A 1312a

| TITLE | MESSAGE 1 2 3 4 5 6 7 8 9 0 1 2 |
|---|---|
| | ADD THIS FUNCTION TO FAVORITE |
| COLOR MODE | 2-SIDED COPY |
| | PAGE AGGREGATION AGGREGATE PLURALITY OF PAGES TO ONE SHEET |
| | STAPLE |
| | BINDING MARGIN SHIFT PRINTING POSITION TO MAKE MARGIN |
| | EDGE ERASE PREVENT SHADOW FROM BEING MADE IN PERIPHERY |

A, B labels on rows

FIG. 9B 1312b

| TITLE | MESSAGE 1 2 3 4 5 6 7 8 9 0 1 2 |
|---|---|
| | ADD THIS FUNCTION TO FAVORITE — B |
| 2-SIDED COPY | DESIGNATE CHAPTER DIVISION, SHIFT TO EDIT MODE — C |
| | PAGE AGGREGATION, AGGREGATE PLURALITY OF PAGES TO ONE SHEET — A |
| | BINDING MARGIN, SHIFT PRINTING POSITION TO MAKE MARGIN — B |
| | STAPLE — A |
| | COLOR MODE |
| | SKIP BLANK SHEET, OMIT BLANK PAGE FROM — B |

| TITLE | MESSAGE 1 2 3 4 5 6 7 8 9 0 1 2 |
|---|---|
| | ADD THIS FUNCTION TO FAVORITE |
| BINDING MARGIN | STAPLE |
| | PUNCH MAKE PUNCH HOLE |
| | 2-SIDED COPY |
| | SHEET CHANGE PAPER FEED TRAY |
| | SUPPRESS BACKGROUND WHITEN FAINT COLOR | c1

FIG. 9D 1312d

| TITLE | MESSAGE 1 2 3 4 5 6 7 8 9 0 1 2 |
|---|---|
| | ADD THIS FUNCTION TO FAVORITE |
| COVER/ INDEX PAPER | PAGE AGGREGATION, AGGREGATE PLURALITY OF PAGES TO ONE SHEET |
| | STAPLE |
| | 2-SIDED COPY |
| | COLOR MODE |
| | BINDING MARGIN SHIFT PRINTING POSITION TO MAKE MARGIN | d1

FIG. 9E 1312e

| TITLE | MESSAGE 1 2 3 4 5 6 7 8 9 0 1 2 |
|---|---|
| | ADD THIS FUNCTION TO FAVORITE |
| COUNT NUMBER OF DOCUMENTS | SKIP BLANK SHEET OMIT BLANK PAGE FROM DOCUMENT |
| | JOB BUILD MODE, SET LARGE QUANTITY OF DOCUMENTS COLLECTIVELY |
| | 2-SIDED COPY |
| | PRINT PAGE NUMBER |
| | DOCUMENT CHANGE DOCUMENT SIZE | e1, e2

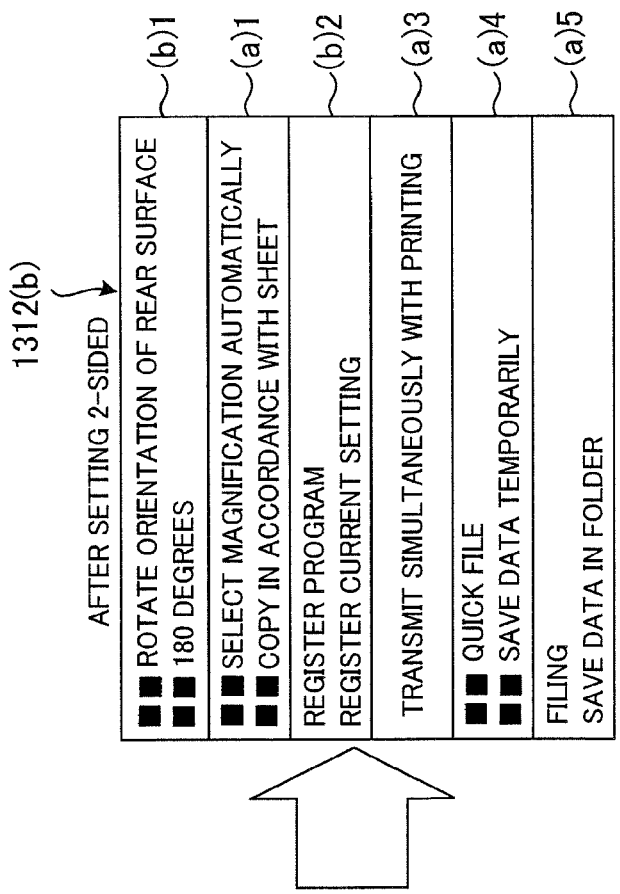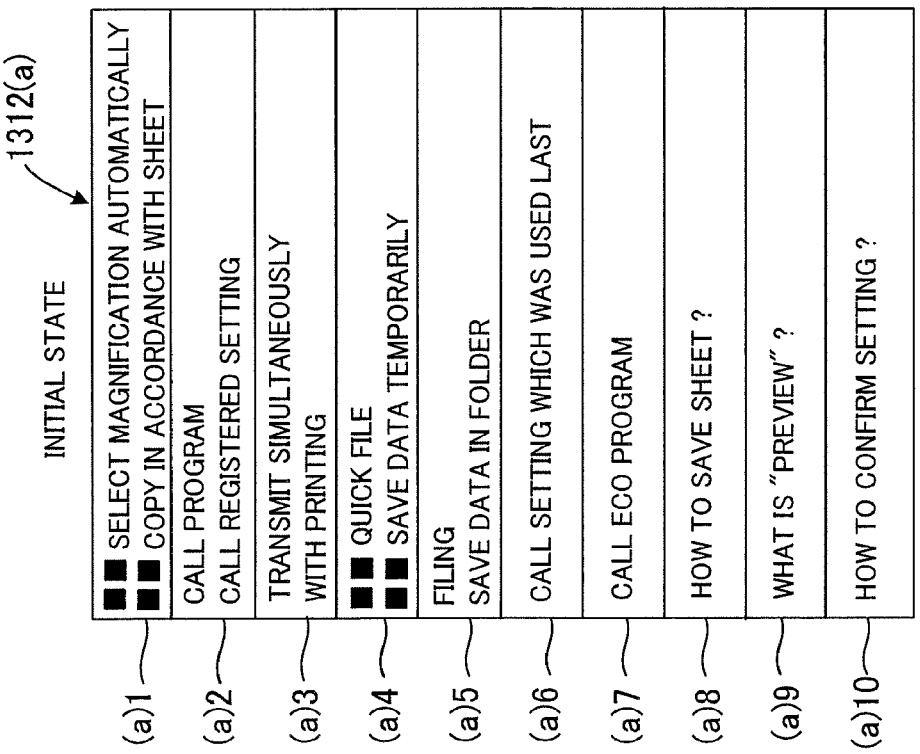
FIG. 10A
FIG. 10B

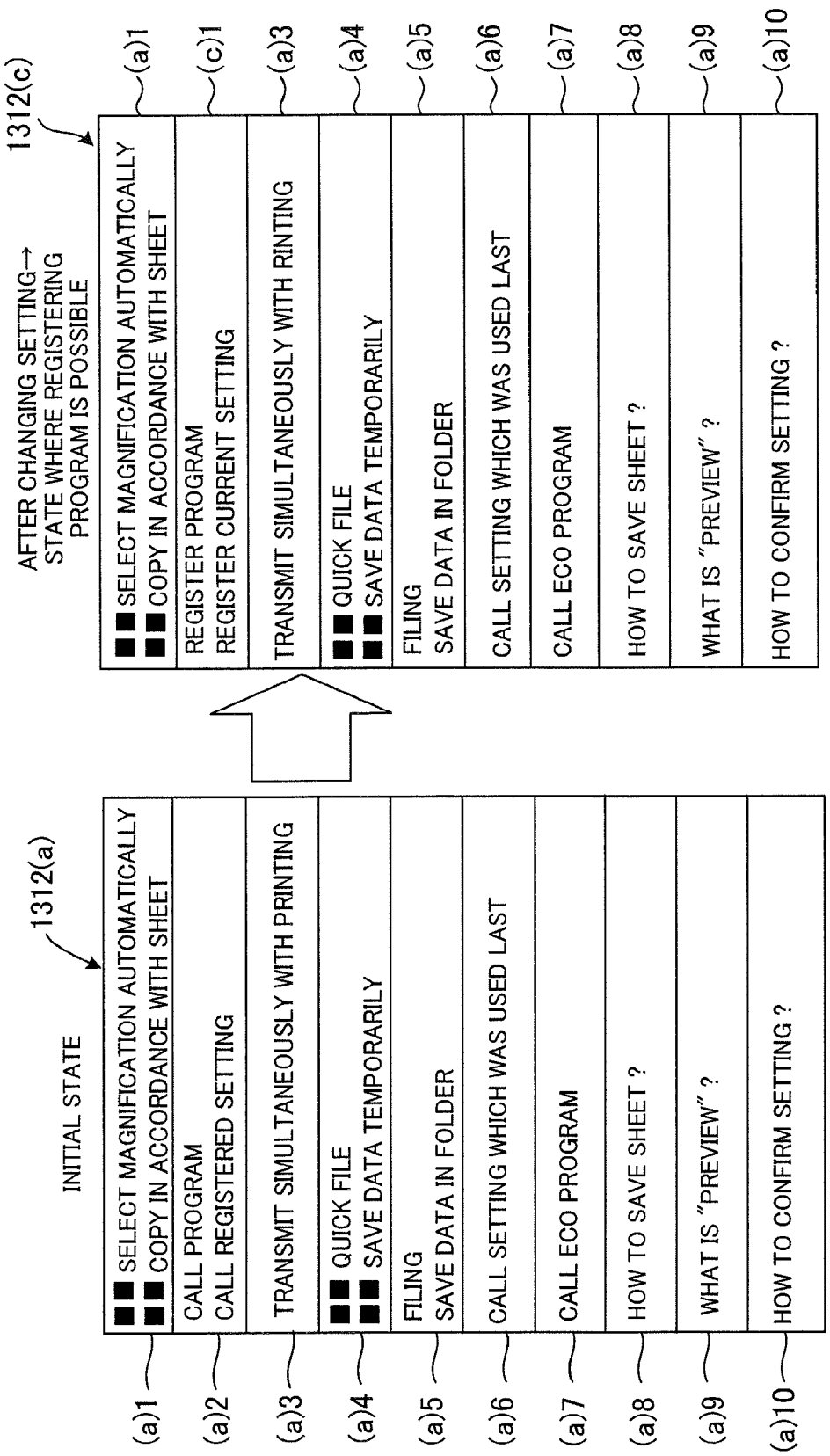

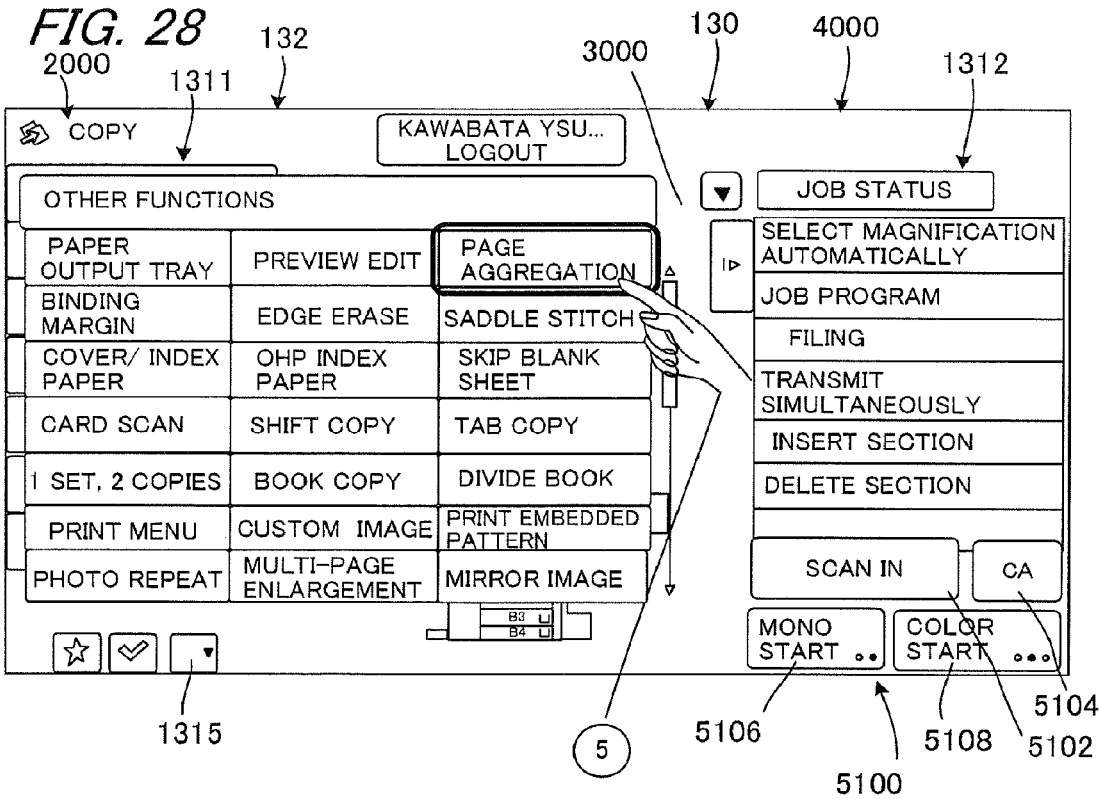

IMAGE FORMING APPARATUS

This Nonprovisional application is a continuation of U.S. application Ser. No. 13/274,595, filed Oct. 17, 2011, which claims priority under 35 U.S.C. §119(a) on Patent Application No. 2010-235871 filed in Japan on 20 Oct. 2010, the entire contents of which are hereby incorporated by reference.

BACKGROUND OF THE INVENTION

1. Field of the Invention

The present invention relates to an image forming apparatus such as a copier, a printer, and a facsimile, and, in particular, relates to an image forming apparatus having a function of setting an image output condition of an image to be output based on input image data.

2. Description of the Prior Art

In recent years, a copier is commercialized as a product provided with versatile copying processing functions as one of methods to provide characteristics of a digital multi-functional peripheral.

For example, as an example of the digital multi-functional peripheral, an image forming apparatus has been known that includes an input portion having a function of additionally inputting image data and an output portion for conducting image output based on the image data input by the input portion, and has a function of setting an image output condition of the image output by the output portion. According to the image forming apparatus, it is possible to easily set and change the image output condition of the image to be output before executing a job.

However, in order to fully utilize versatile functions provided in the recent image forming apparatus, if a user is not used to using the apparatus on a routine basis, there has been a case where erroneous copy is caused by an error in operation of setting a copying processing condition or the like.

Accordingly, even if the image forming apparatus includes useful functions, the reality is such that functions actually used by a user are limited to conventional functions, and convenient functions are used less frequently. Consequently, functions provided in the image forming apparatus are fully not utilized.

Thus, there has been proposed a technology in which a guide function of an image forming apparatus, which is provided as a digital multi-functional peripheral, is provided for a user to effectively use the provided functions (see Patent Literature 1).

Patent Literature 1 (Japanese Patent Application Laid-open No. 1999-288344) discloses that "function guidance display function" is provided, and an user can use the functions provided in the apparatus actively by means of guidance display in which the function provided in the apparatus is selected based on a usage state of the apparatus.

Specifically, in Patent Literature 1, when the user tries to place a book document on a document platen for copying, for example, as hint information, the presence of a 1 set, 2 copies (spread copy) function and an edge erase function is shown, and when a screen is touched to confirm what the function is, guidance information for the function is displayed.

Further, when the user who recognizes the function selects a desired function, explanatory patterns of selectable functions are also displayed on an operation screen.

As described above, according to the technology described in Patent Literature 1, it is possible to guide and select functions provided in the image forming apparatus for the user easily.

However, there is a problem in that a user who is unfamiliar to the functions may confuse during the operation of the functions because the functions requires the user to shift from a present screen of setting operation to another screen or to display another screen on which the previous screen is overlaid, in order to obtain the explanation of a function (display screen of function explanation).

SUMMARY OF THE INVENTION

The present invention has been achieved in view of the conventional problems described above. It is an object of the present invention to provide an image forming apparatus which allows a user to easily select a desired function out of functions provided in the apparatus so as to improve operability and prevent erroneous printing due to an incorrect operation or the like in using a function provided in the image forming apparatus.

The present invention provides an image forming apparatus includes an image display operation device. The image display operation device includes a function selecting portion to correlate with a plurality of functions executed in the image forming apparatus so as to be executable, and a display portion to display the function selecting portion, and a display control portion having a function of causing the display portion to display the function selecting portion, characterized in that as a configuration of the function selecting portion, a first function selecting portion in which selectable function items are displayed in accordance with an operation mode selected in the image forming apparatus and a second function selecting portion in which other function items that simultaneously selectable are displayed, except for functions according to the first function selecting portion are provided, as a configuration of the display control portion, a function of displaying the first function selecting portion and the second function selecting portion on the display portion at the same time is provided, and as configuration of the image display operation device, functions selectable by the first function selecting portion and functions selectable by the second function selecting portion are allowed to be selectable at the same time.

Further, in the present invention, it is preferable that the second function selecting portion is correlated with functions related to functions according to the first function selecting portion so as to be executable.

Further, in the present invention, it is preferable that as a configuration of the first function selecting portion, a detail setting portion associated with functions related to respective functions of the first function selecting portion so as to be executable is provided, and when a specific function is selected in the first function selecting portion, the display control portion displays the detail setting portion associated with the specific function on the display portion.

Further, in the present invention, it is preferable that as a configuration of the second function selecting portion, a related function selecting portion associated with functions related to respective functions of the detail setting portion so as to be executable is provided, and when a specific function is selected in the detail setting portion, the display control portion switches the second function selecting portion to the related function selecting portion associated with the specific function for displaying.

Further, in the present invention, it is preferable that when a specific function is selected in the related function selecting portion, the display control portion displays the detail setting portion associated with the specific function on the display portion.

Further, in the present invention, it is preferable that the first function selecting portion is configured so as to be associated with functions of setting finishing processing so as to be executable, and as a configuration of the display control portion, a finishing state display portion for displaying a finishing state of an image based on the functions of setting the finishing processing is provided, and a function of displaying the finishing state of the image by the finishing state display portion as well as displaying the second function selecting portion is further provided.

In the present invention, the finishing processing includes processing of performing staple, punch or the like for bundling sheets of paper on which an image is formed by a post-processing device at the time of outputting after image formation in the image forming apparatus.

Further, in the present invention, it is preferable that the second function selecting portion is configured so as to be associated with functions related to the functions of setting the finishing processing so as to be executable, and as a configuration of the display control portion, processing based on a function selected from the functions related to the functions of setting the finishing processing in the second function selecting portion is reflected to an image displayed by the finishing state display portion.

Further, in the present invention, it is preferable that as a configuration of the function selecting portion, an image output instructing portion associated with functions of instructing image output so as to be executable is provided, and as a configuration of the display control portion, when displaying a finishing state of an image by the finishing state display portion, the image output instructing portion is displayed in a close vicinity of the second function selecting portion.

According to the present invention, in an image forming apparatus provided with an image display operation device including a function selecting portion to correlate with a plurality of functions executed in the image forming apparatus so as to be executable, a display portion to display the function selecting portion, and a display control portion having a function of causing the display portion to display the function selecting portion, as a configuration of the function selecting portion, a first function selecting portion in which selectable function items are displayed in accordance with an operation mode selected in the image forming apparatus and a second function selecting portion in which other function items that are simultaneously selectable are displayed except for functions according to the first function selecting portion are displayed are provided, as a configuration of the display control portion, a function of displaying the first function selecting portion and the second function selecting portion on the display portion at the same time is provided, and as a configuration of the image display operation device, functions selectable by the first function selecting portion and functions selectable by the second function selecting portion are allowed to be selectable at the same time, so that it is possible to provide the image forming apparatus in which the presence of versatile convenient functions provided in the apparatus is realized and a function desired by a user is easily selectable from among these functions, and erroneous printing due to an incorrect operation or the like is able to be prevented so as to improve operability.

Further, according to the present invention, the second function selecting portion is associated with functions related to functions according to the first function selecting portion, so that the same function is allowed to be made selectable with few operation procedures.

Further, according to the present invention, as a configuration of the first function selecting portion, a detail setting portion associated with functions related to respective functions of the first function selecting portion so as to be executable is provided, and when a specific function is selected in the first function selecting portion, the display control portion displays the detail setting portion associated with the specific function on the display portion, so that a necessary function is allowed to be made selectable with few operation procedures.

Further, according to the present invention, as a configuration of the second function selecting portion, a related function selecting portion associated with functions related to respective functions of the detail setting portion so as to be executable is provided, and when a specific function is selected in the detail setting portion, the display control portion switches the second function selecting portion to the related function selecting portion associated with the specific function for displaying, so that the same function is allowed to be made selectable with few operation procedures.

Further, according to the present invention, when a specific function is selected in the related function selecting portion, the display control portion displays the detail setting portion associated with the specific function on the display portion, so that the same function is allowed to be made selectable with few operation procedures.

Further, according to the present invention, the first function selecting portion is configured so as to be associated with functions of setting finishing processing so as to be executable, and as a configuration of the display control portion, a finishing state display portion for displaying a finishing state of an image based on the functions of setting the finishing processing is provided, and a function of displaying the finishing state of the image by the finishing state display portion as well as displaying the second function selecting portion is further provided, so that the finishing state of the image is displayed by a function selected by the first function selecting portion. Accordingly, the presence of other functions can be informed by the second function selecting portion, and other functions can be made selectable.

Further, according to the present invention, the second function selecting portion is configured so as to be associated with functions related to the functions of setting the finishing processing so as to be executable, and as a configuration of the display control portion, processing based on a function selected from the functions related to the functions of setting the finishing processing in the second function selecting portion is reflected to an image displayed by the finishing state display portion, so that it is possible to easily confirm the finishing state of the image.

Further, according to the present invention, as a configuration of the function selecting portion, an image output instructing portion associated with functions of instructing image output so as to be executable is provided, and as a configuration of the display control portion, when displaying a finishing state of an image by the finishing state display portion, the image output instructing portion is displayed in a close vicinity of the second function selecting portion, so that it is possible to perform a selection operation easily.

BRIEF DESCRIPTION OF THE DRAWINGS

FIGS. 9A to 9E are explanatory views showing an example of items of a second function selecting portion displayed on an action panel region of a touch panel display in the image forming apparatus;

FIG. 10A is an explanatory view showing an example of items in an initial state of the second function selecting portion which is displayed on an action panel region of a touch panel display in a copy mode of the image forming apparatus, and FIG. 10B is an explanatory view showing an example of items of the second function selecting portion after 2-sided copy is selected and set in the copy mode of the image forming apparatus;

FIG. 11A is an explanatory view showing an example of items in an initial state of a second function selecting portion which is displayed on an action panel region of a touch panel display in the copy mode of the image forming apparatus and FIG. 11B is an explanatory view showing an example of items of the second function selecting portion in which an unnecessary item is deleted to add and display a necessary item after 2-sided copy is selected and set in the copy mode of the image forming apparatus;

FIG. 28 is an explanatory view showing a state where a function setting screen is displayed on a display panel of the image forming apparatus;

FIG. 29 is an explanatory view showing a state where a detail setting screen related to aggregating copy is displayed after aggregating copy is selected in the related function selection screen.

DESCRIPTION OF THE PREFERRED EMBODIMENTS

Description will be hereinafter given for embodiments of the present invention with reference to drawings.

Figure 1:
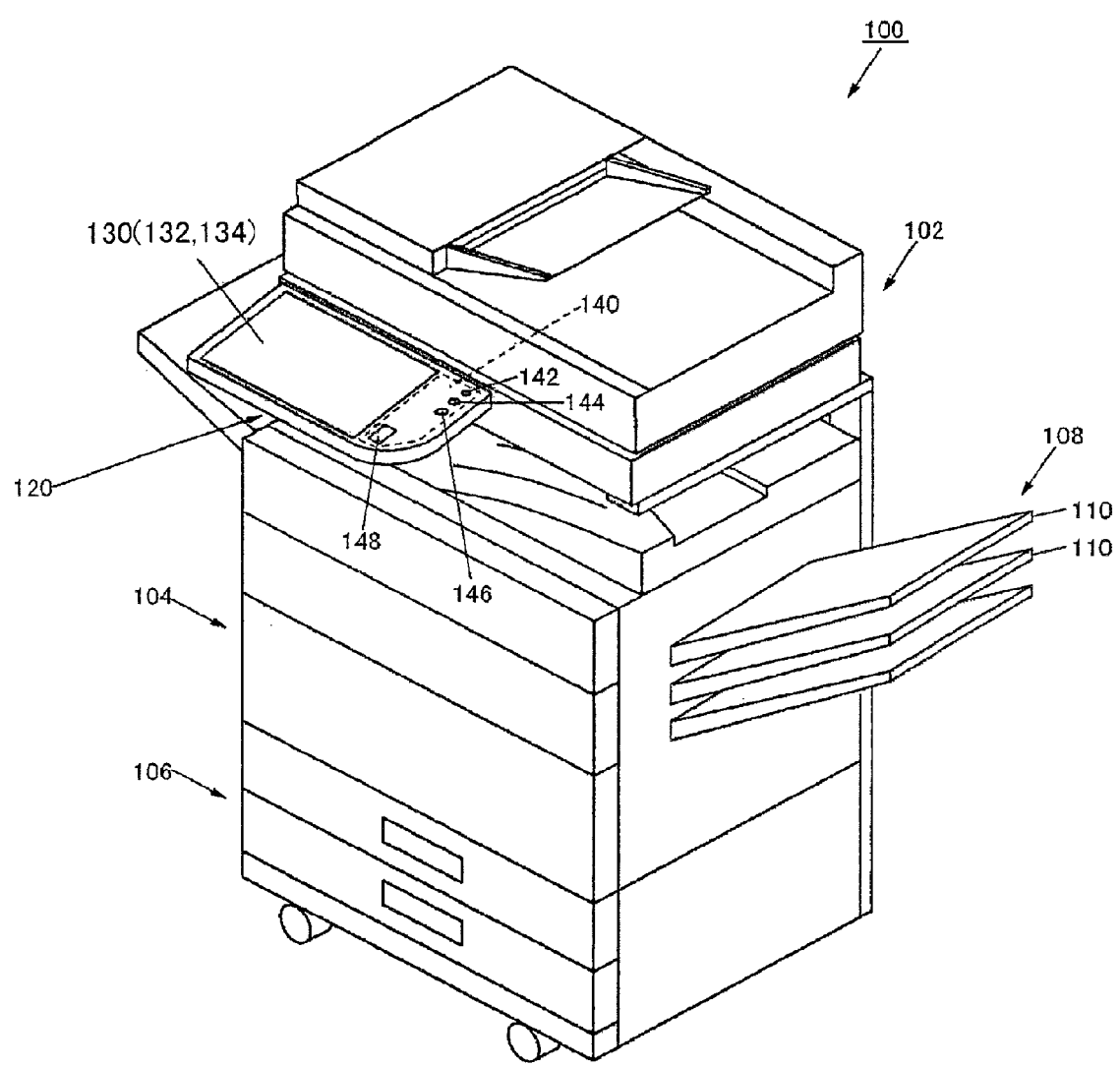
FIG. 1 is en explanatory view showing an entire configuration of an image forming apparatus according to an embodiment of the present invention.
Figure 2:
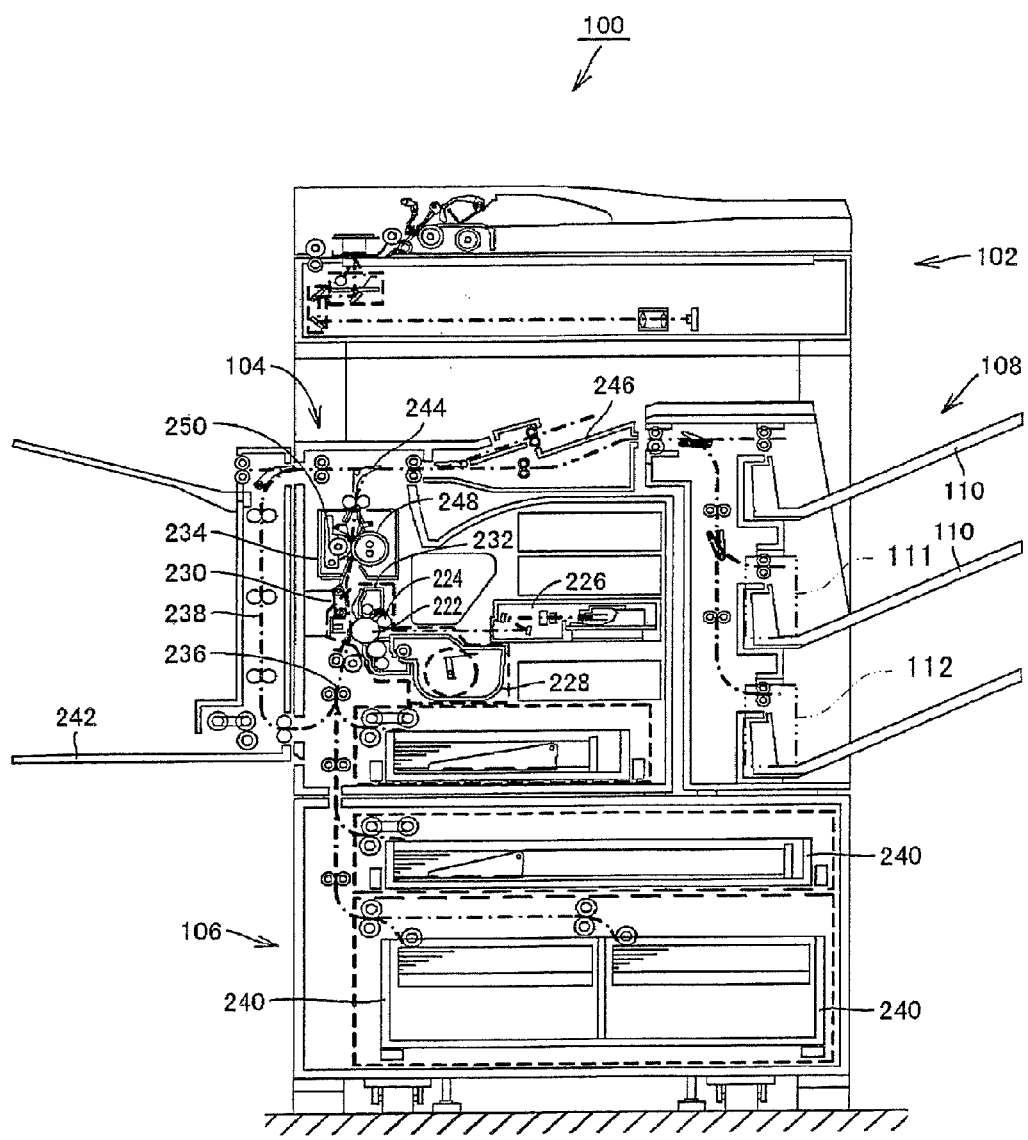
FIG. 2 is an explanatory view showing in a simplified manner an internal configuration of the image forming apparatus.
Figure 3:
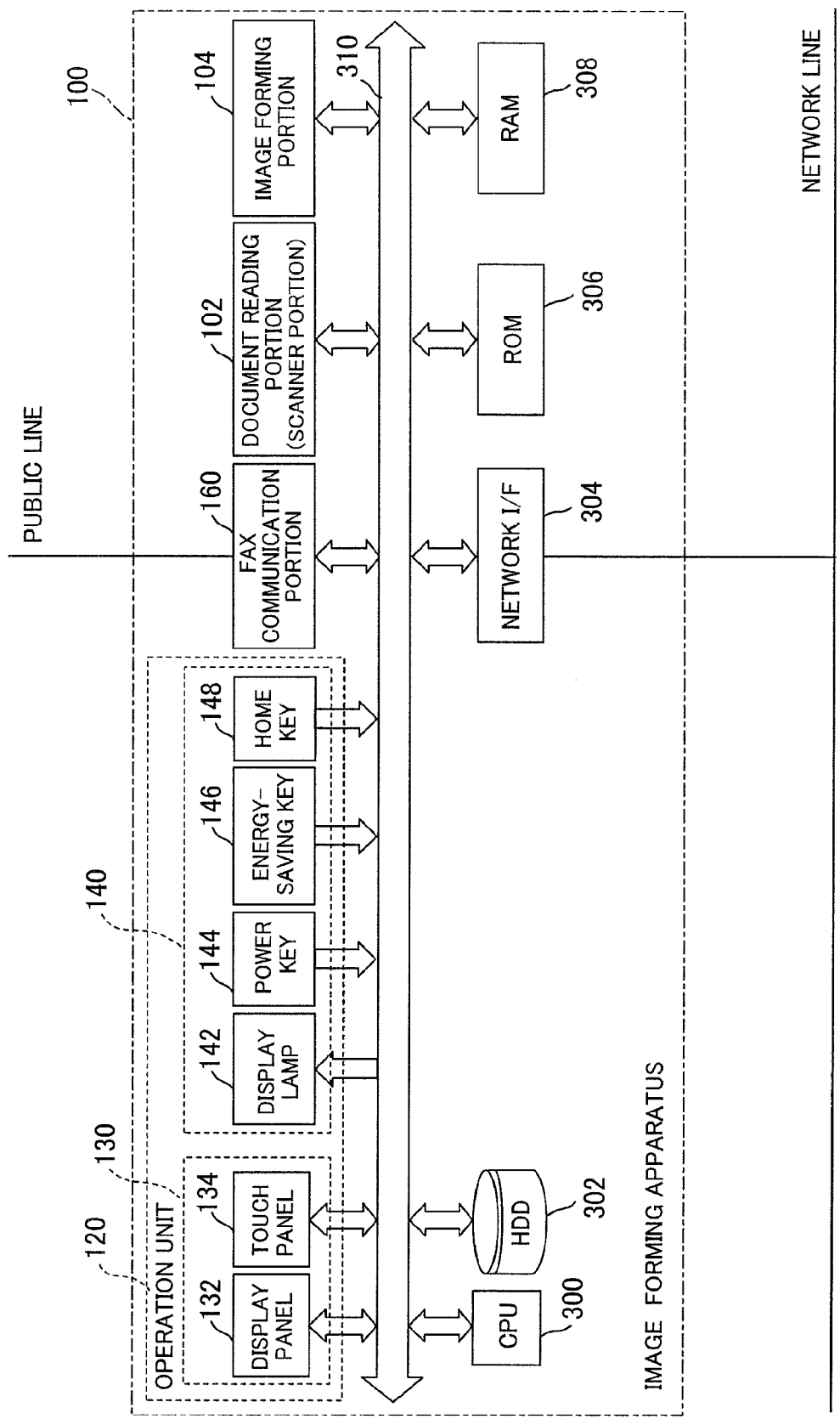
FIG. 3 is a functional block diagram showing a hardware configuration of the image forming apparatus.
Figure 4:
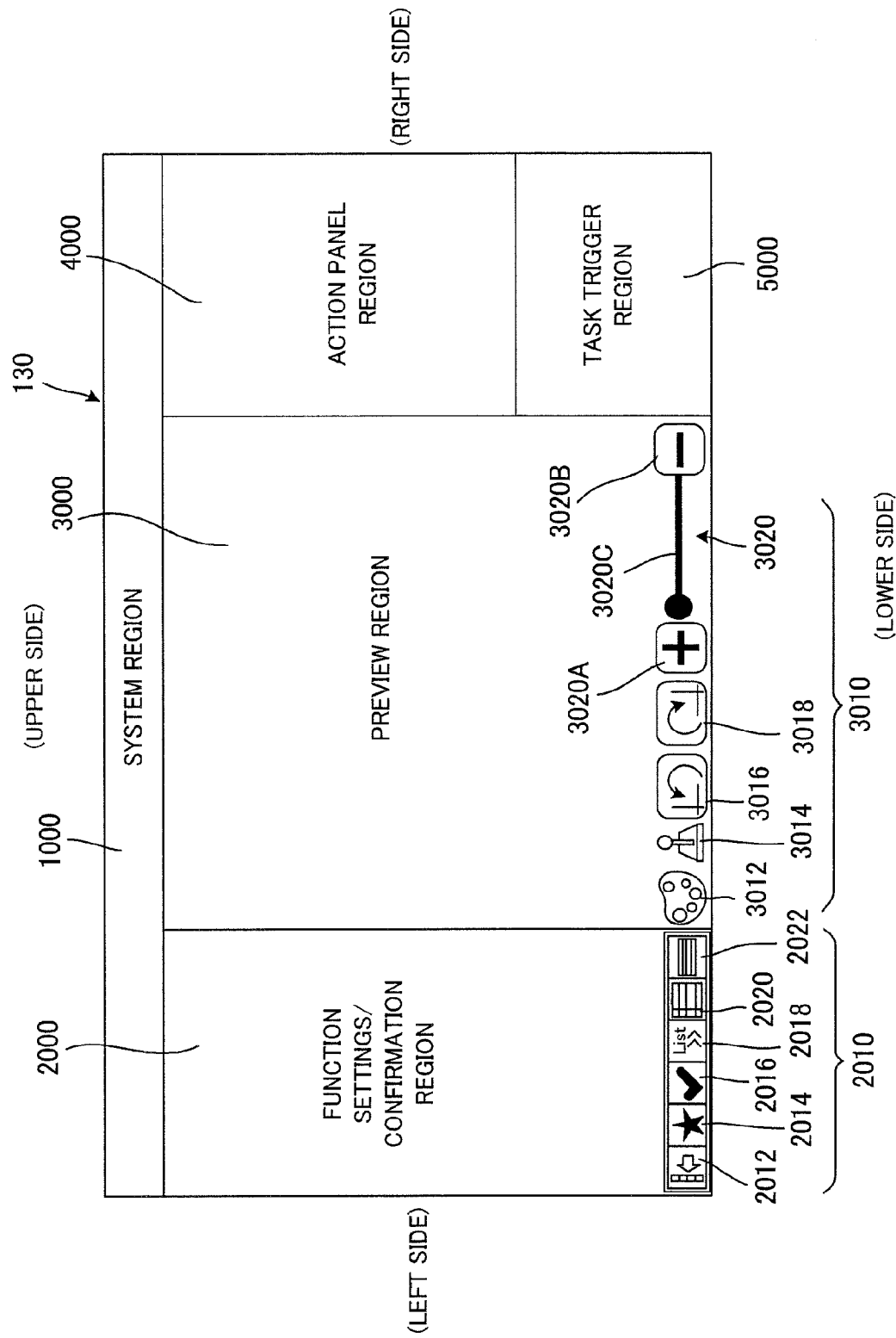
FIG. 4 is an explanatory view showing a display region of a touch panel display of the image forming apparatus.
Figure 5:
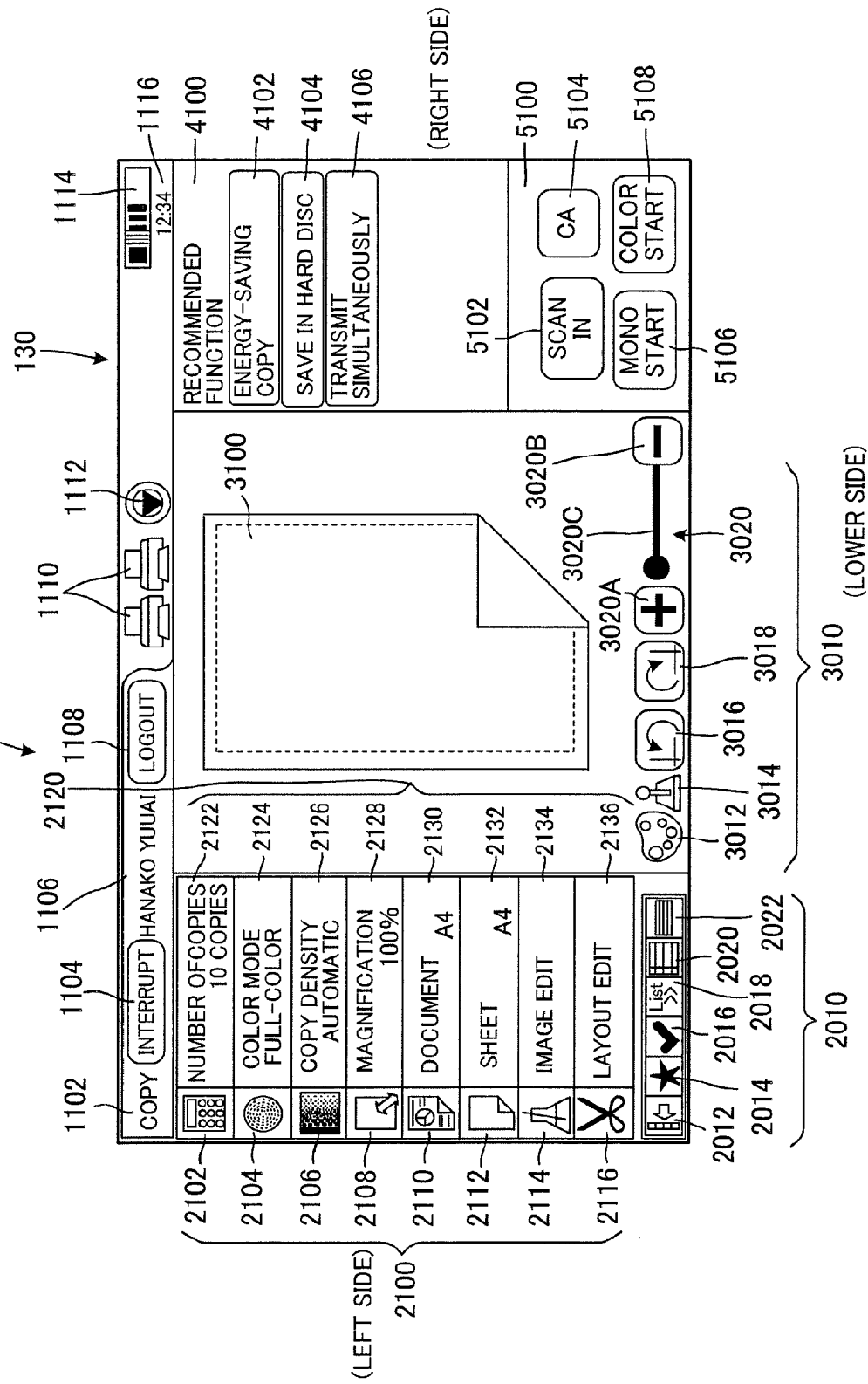
FIG. 5 is an explanatory view showing an exemplary screen displayed on the touch panel display.

FIG. 1 shows one exemplary embodiment for carrying out the invention and is an explanatory view showing an entire configuration of an image forming apparatus according to an embodiment of the present invention. FIG. 2 is an explanatory view showing in a simplified manner an internal configuration of the image forming apparatus. FIG. 3 is a functional block diagram showing a hardware configuration of the image forming apparatus. FIG. 4 is an explanatory view showing a preview display region of a touch panel display of the image forming apparatus. FIG. 5 is an explanatory view showing an exemplary screen displayed on the touch panel display.

The embodiment of the present invention is such that, as shown in FIG. 1, in an image forming apparatus 100 provided with a document reading portion 102 having a function of additionally inputting image data, an image forming portion 104 for forming an image on a recording medium based on the image data input by the document reading portion 102, a display panel (display portion) 132 for displaying a preview image based on the image data, and an operation unit (image display operation device) 120 having a function of displaying on the display panel 132 a preview of a display image based on the image data input from the document reading portion 102 as well as having a function of setting an image output condition of the image output on the recording medium by the image forming portion 104, a configuration of an image display operation device according to the present invention is employed as a configuration of the operation unit 120.

The operation unit 120 which functions as the image display operation device has a function of setting an image output condition of an image output by the image forming portion 104 and is constituted so as to set the image output condition of the output image on the display panel 132.

A plurality of document images displayed on the display panel 132 are to display previews of forms of document images retrieved from the document reading portion of the image forming apparatus 100 and the like and to display output forms of the image formed on a recording medium from the image forming portion as finish preview images.

The image forming apparatus 100 according to the present embodiment is an image forming apparatus which is one kind of an image processing apparatus. The image display operation device according to the present invention may be applied to an image processing apparatus or electronic equipment other than such an image forming apparatus.

In addition, the image forming apparatus 100 according to the present embodiment may be an apparatus having a plurality of operation modes and provided with a display device for displaying information so that when the operation mode is switched to switch a screen of the display device, even if a user does not remember a screen configuration, the user is able to obtain information desired by the user easily.

Note that, the image forming apparatus 100 according to the present embodiment is provided with a touch panel display (operation screen) capable of operations by a gesture operation method and a touch operation method not involving the gesture operation, but may be an apparatus provided with a touch panel display capable of only touch operations and further may be an apparatus provided with a display panel incapable of operations and only capable of display and a button for operations.

The image forming apparatus 100 forms an image on a sheet of recording paper by an electrophotographic system.

In addition, the image forming apparatus 100 is provided with a copy mode, a facsimile mode (FAX mode), a document filing mode (mode of storing a scanned image in a storage device in the inside of the image forming apparatus) and a mail mode (mode of transmitting a scanned image in a form attaching to an electronic mail) as operation modes. Note that, the image forming apparatus 100 may be further provided with a network printer mode.

Moreover, the present invention is not limited thereto and may be an image forming apparatus in which a screen is switched for each operation mode. In addition, a printing system is not limited to an electrophotographic system.

First, description will be given for the image forming apparatus 100 according to the embodiment of the present invention.

The image forming apparatus 100 according to the present embodiment is provided with, as shown in FIG. 1, the image reading portion 102, the image forming portion 104, a paper feed portion 106, a paper output processing device 108, and the operation unit 120.

The operation unit 120 is constituted by a touch panel display 130 and a display operation portion 140. The touch panel display 130 is constituted by a display panel 132 constituted by a liquid crystal panel or the like and a touch panel (touch operation confirming portion) 134 which is arranged being overlaid on the display panel 132 and detects a position pressed by the finger of a user. The display operation portion 140 is constituted by a display lamp 142, a power key 144, an energy-saving key 146, and a home key 148 for returning a display screen of the touch panel display 130 to a home screen for selecting an operation mode.

In this way, the image forming apparatus 100 is provided with the touch panel display 130 as a main operation device and is provided with the display operation portion 140 constituted by hardware keys and the display lamp. The keys (the power key 144, the energy-saving key 146 and the home key 148) of the display operation portion 140 have a characteristic of being constituted as hardware buttons compared to software buttons constituted by the touch panel display 130.

Note that, the image forming apparatus 100 is not limited to one provided with the display operation portion 140 with such a configuration and may be one provided with only the touch panel display 130. The image forming apparatus 100 may be one in which, when the user selects an operation mode in the home screen displayed on the touch panel display 130, the screen is switched to an initial screen in the selected operation mode. Description will be given for operation modes of such an image forming apparatus 100.

(Copy Mode)

In the following, description will be given for operations in a copy mode of the image forming apparatus 100.

In this copy mode, the document reading portion (hereinafter, referred to as the "scanner portion") 102 and the image forming portion 104 are mainly operated.

In the image forming apparatus 100, a document placed on a document platen is read by the document reading portion 102 as image data and the read image data is input to a CPU 300 constituted by a microcomputer or the like shown in FIG. 3, the image data is subjected to various image processing here, and the image data is output to the image forming portion 104.

As shown in FIG. 2, the image forming portion 104 is for printing an image of the document represented by the image data on a recording medium (in most cases, on a sheet of recording paper), and is provided with a photoreceptor drum 222, a charging device 224, a laser scanning unit (hereinafter, referred to as an "LSU") 226, a developing device 228, a transfer device 230, a cleaning device 232, a fixing device 234, and a charge erasing device which is not shown.

In the image forming portion 104, a main conveying path 236 and a reverse conveying path 238 are provided, and a sheet of recording paper fed from the paper feed portion 106 is conveyed along the main conveying path 236. The paper feed portion 106 draws out sheets of recording paper stored in a paper cassette 240 or sheets of recording paper stacked on a manual tray 242 one by one, and feeds the sheet of recording paper to the main conveying path 236 of the image forming portion 104.

While the sheet of recording paper is conveyed along the main conveying path 236 of the image forming portion 104, the sheet of recording paper passes between the photoreceptor drum 222 and the transfer device 230, and further passes through the fixing device 234, whereby printing is done on the sheet of recording paper.

The photoreceptor drum 222 rotates in one direction, and its surface is cleaned by the cleaning device 232 and the charge erasing device and, thereafter, uniformly charged by the charging device 224.

The LSU 226 modulates laser beam based on the image data to be printed, and repeatedly scans the surface of the photoreceptor drum 222 with the laser beam in a main scanning direction, whereby an electrostatic latent image is formed on the surface of the photoreceptor drum 222.

The developing device 228 develops the electrostatic latent image by supplying toner to the surface of the photoreceptor drum 222, and a toner image is formed on the surface of the photoreceptor drum 222.

The transfer device 230 transfers the toner image on the surface of the photoreceptor drum 222 to the sheet of recording paper passing between the transfer device 230 and the photoreceptor drum 222.

The fixing device 234 includes a heating roller 248 for heating the sheet of recording paper and a pressing roller 250 for pressing the sheet of recording paper. As the sheet of recording paper is heated by the heating roller 248 and pressed by the pressing roller 250, the toner image that has been transferred to the sheet of recording paper is fixed on the sheet of recording paper. A heater is heated by electric power supplied to the fixing device 234 and controlled such that temperature of the heating roller 248 attains to an appropriate temperature for fixing. Note that, when being shifted to the energy-saving mode, for example, the electric power supplied to the heater is stopped or reduced.

At a position of connection between the main conveying path 236 and the reverse conveying path 238, a separation pawl 244 is arranged. When printing is done only on one side of the sheet of recording paper, the separation pawl 244 is so positioned that the sheet of recording paper from the fixing device 234 is guided to a paper output tray 246 or the paper output processing device 108 by the separation pawl 244.

When printing is done on both sides of the sheet of recording paper, the separation pawl 244 is turned to a prescribed direction, so that the sheet of recording paper is guided to the side of the paper output tray 246 temporarily, and thereafter conveyed in a switchback manner to be guided to the reverse conveying path 238. The sheet of recording paper passes through the reverse conveying path 238, is turned upside-down and again conveyed to the main conveying path 236, and while being conveyed again along the main conveying path 236, printing is done on the rear surface thereof, and thereafter the sheet is guided to the paper output tray 246 or to the paper output processing device 108.

The sheet of recording paper printed as described above is guided to the paper output tray 246 or to the paper output processing device 108 and ejected to the paper output tray 246, or ejected to any of paper output trays 110 of the paper output processing device 108.

The paper output processing device 108 applies processing of sorting a plurality of sheets of recording paper to be ejected to the respective paper output trays 110, processing of punching each sheet of recording paper or processing of stapling each sheet of recording paper. For example, when a number of copies of prints are to be prepared, sheets of recording paper are sorted and ejected to each of the paper output trays 110 such that each paper output tray 110 contains each set of printed sheets, and each sheet of recording paper in each paper output tray 110 is subjected to punching processing by a punching unit 111 or stapling processing by a stapling unit 112 for each paper output tray 110, whereby copies of prints are prepared.

(Facsimile Mode)

Description will be given for operations in a facsimile mode below.

In the facsimile mode, the document reading portion (scanner unit) 102 and a FAX communication portion 160 mainly operate for a transmission operation and the FAX communication portion 160 and the image forming portion 104 mainly operate for a reception operation as shown in FIG. 3.

(Transmission Operation)

In the image forming apparatus 100, when the facsimile mode is designated, a document placed on the document platen is read by the document reading portion 102 as image data, the read image data is input to the CPU 300 constituted by a microcomputer or the like shown in FIG. 3, the image data is subjected to various image processing here, and the image data is output to a FAX communication portion (FAX communication portion 160 of FIG. 3).

As shown in FIG. 3, the FAX communication portion 160 of the image forming apparatus 100 on the transmitting side connects a designated transmitting side line to a designated transmission destination, and converts the image data to communication data in compliance with facsimile communication standard to transmit to a facsimile apparatus (for example, the image forming apparatus 100 provided with the facsimile function) on the receiving side.

(Communication Operation)

When the line is connected, the FAX communication portion 160 of the image forming apparatus 100 on the receiving side detects a communication request signal from the FAX communication portion 160 of the image forming apparatus 100 on the transmitting side, and transmits a response signal. Thereafter, for example, the FAX communication portions 160 exchange performance information supported by the transmitting side and the receiving side respectively, determine highest possible speed of communication, a method of coding/code correction of image data and the like, and set the method of communication of modems. Using the image signal static in accordance with the communication method, data is transmitted from the FAX communication portion 160 of the image forming apparatus 100 on the transmitting side to the FAX communication portion 160 of the image forming apparatus 100 on the receiving side. When the transmission is finished, the line is disconnected.

(Reception Operation)

The FAX communication portion 160 of the image forming apparatus 100 on the receiving side converts the received data to image data to transmit to the image forming portion 104. Note that, the received data may be converted to image data at the image forming portion 104. The image forming portion 104 prints an image of a document represented by the image data converted from the received data on a sheet of recording paper, in a manner similar to the operation in the copy mode described above.

Next, description will be given for a control block configuration of the image forming apparatus 100 with reference to drawings.

As shown in FIG. 3, the image forming apparatus 100 further includes the operation unit 120 allowing setting of functions provided in the apparatus as the copy mode and the facsimile mode, a ROM 306 for storing programs and the like, a hard disc 302 serving as a non-volatile storage region capable of storing programs, data and the like even when power is cut off, and a RAM (Random Access Memory) 308 for providing a storage region when a program is executed.

The image forming apparatus 100 further includes a bus 310 connected to the document reading portion 102, the image forming portion 104, the FAX communication portion 160, the operation unit 120, the ROM 306, the hard disc 302 and the RAM 308, and the CPU 300 connected to the bus 310, for realizing general functions as the image forming apparatus.

The hard disc 302 stores files of image data of documents scanned by the image forming apparatus 100. In addition, the hard disc 302 stores initial screen data of each operation mode (not the hard disc 302 but the ROM 306 is also able to be caused to store).

The ROM 306 stores programs, data and the like necessary for controlling operations of the image forming apparatus 100. As data to be stored in the ROM 306 with programs, initial screen data of each operation mode may be stored. The CPU 300 controls the image forming apparatus 100 in accordance with the programs and data stored in the ROM 306, and executes control related to each function of the image forming apparatus 100.

As shown in FIG. 3, a public line is connected for transmitting/receiving image data, to the FAX communication portion 160 of the image forming apparatus 100, and to a network interface 304, a network line is connected. To the network line, a computer or the like using the image forming apparatus 100 as a network-supported printer is connected or a computer or the like identified by a URL (Uniform Resource Locator) designated through the Internet is connected. When connected to the Internet in this way, the image forming apparatus 100 is able to obtain necessary information through the Internet.

The RAM 308 provides a function as a working memory for temporarily storing results of calculations and processing by the CPU 300, and a function as a frame memory for storing image data.

The CPU 300 controls the document reading portion 102, the image forming portion 104, the touch panel display 130 and the display operation portion 140 constituting the operation unit 120, as well as the ROM 306, the hard disc 302 and the RAM 308, by executing a prescribed program. Note that, the operation unit 120 communicates with the CPU 300 through an input/output interface.

The operation unit 120 is constituted by a plate-shaped panel provided being inclined so that the user views easily. On the surface of the operation unit 120, the touch panel display 130 is provided in its left-side area and the display operation portion 140 (the display lamp 142 as well as the power key 144, the energy-saving key 146 and the home key 148 which are hardware buttons) is provided in its right-side region. The touch panel display 130 and the display operation portion 140 are constituted integrally to be one piece with the operation unit 120 as a whole.

As described above, the touch panel display 130 is constituted by the display panel 132 and the touch panel 134 arranged being overlaid on the display panel 132.

In the touch panel display 130, the home screen for selecting an operation mode in the image forming apparatus 100, a current state of the image forming apparatus 100, a state of destination designation, a state of job processing and the like are displayed on the display panel 132. On a preview display region of the display panel 132, as a selection button serving as a software button is displayed, and when a region where the selection button is displayed is pressed by a finger, the pressed position is detected by the touch panel 134. By comparing the display position of the selection button and the position where the touch panel 134 is pressed on a program, selection of an operation mode, setting of a function, instruction of an operation and the like of the image forming apparatus 100 are carried out. In addition to such a touch operation (command input operation based on pressing position by the user), the image forming apparatus 100 also allows the gesture operation (command input operation based on operation trajectory by the user) as described above.

Moreover, the display lamp 142 of the display operation portion 140 is constituted by, for example, an LED (Light Emitting Diode), and is turned on/off (or flickered) under the control of the CPU 300. When the power key 144 which is provided separately from a main power switch is pressed by the user, the image forming apparatus 100 shifts from a standby mode (in which, for example, only a FAX receiving operation is allowed with the main power turned on) to a normal mode, so that all operation modes of the image forming apparatus 100 become available. In conjunction with the state, the display lamp 142 is turned on. Further, when a time period in which the user makes no operation exceeded a predetermined time period or the user presses the energy-saving key 146, the image forming apparatus 100 shifts from the normal mode to the energy-saving mode, so that only apart of operation modes of the image forming apparatus 100 is available. In conjunction with the state, the display lamp 142 is flickered. Further, when the user presses the energy-saving key 146 in the energy-saving mode, the image forming apparatus 100 shifts from the energy-saving mode to the normal mode. The home key 148 is a hardware key for returning the display of the touch panel display 130 to the initial state (home screen). Note that, the processing when the power key 144, the energy-saving key 146, or the home key 148 is pressed is not limited thereto.

Note that, a key lamp, which is turned on/off (or flickered) under the control of the CPU 300, may be embedded in the hardware buttons (the power key 144, the energy-saving key 146 and the home key 148) of the display operation portion 140. For example, the key lamp provides a light ring to five peripheries of a circular key, or provides light to the center part of the key. The key lamp is turned on at the timing when hardware buttons are allowed to be used as the operation device (at the timing when processing is executed when hardware buttons are used).

The image forming apparatus 100 according to the present embodiment is provided with two operation modes (the copy mode and the fax mode) described above. On the touch panel display 130, software buttons for setting functions in each of the operation modes, and, as necessary, buttons for setting a preview which is an image of image formation or a destination and the like are displayed.

When the operation mode is different, a different screen is displayed on the touch panel display 130. For allowing the user to find required information easily even in such a case, such an essential part of the present invention is provided that the touch panel display 130 is divided into a plurality of regions (with the size of the regions being variable) to display information in each region. In particular, in the image forming apparatus 100, when the operation mode is selected in the home screen of the touch panel display 130 which is provided as a main display operation device, the initial screen of each operation mode is displayed.

In the initial screen, (1) since a basic layout is divided into five regions ("a system region", "a function selection region", "a preview region", "an action panel region" and "a task trigger region") and appropriately arranged, by operating from the upper left to the lower right by the user (because a flow line of the viewpoint and a flow line of the finger tip of the user are realized similarly to a conventional apparatus which is not provided with such a large-sized touch panel display 130), setting is possible easily, and (2) even in the different operation mode, the concept displayed on each of the five regions is the same, so that the user is able to perform an operation without confusion even when the operation mode is different.

Description will hereinafter be given for the configuration of such a basic layout.

First, description will be given for the basic layout in the touch panel display 130 of the image forming apparatus 100 with reference to drawings.

The basic layout of the touch panel display 130 is constituted by a system region 1000 which is arranged in the uppermost part, a preview region (preview display region) 3000 which is arranged in the center part of the screen, a function setting/confirmation region 2000 (hereinafter, described as a function selection region 2000) which is arranged on the left side of the preview region 3000, an action panel region 4000 which is arranged in the upper right part of the preview region 3000, and a task trigger region (operation key display region) 5000 which is arranged in the lower right part of the preview region 3000 in the horizontally-long touch panel display 130 (for example, 1024 pixels width×600 pixels long) as shown in FIG. 4.

Note that, the number of regions in the touch panel display 130 is not limited to 5 and the right and left arrangements are also not limited thereto, and, for example, the right and left arrangements may be reversed depending on the dominant hand of the user. Moreover, the system region 1000 may be positioned in the lowest part. In addition, the system region 1000 may not be displayed depending on the state or setting.

In the system region 1000, the state at the present moment of the image forming apparatus 100 is displayed, and a title of the operation mode being operated and the status/state of the image forming apparatus 100 are displayed. For example, in the system region 1000, an operation mode name, an interrupt key, a log-in user name, a state of job being processed, a usage state of an embedded memory, a time and the like are displayed.

In the function selection region 2000, function selection menus (such as icons and buttons) which are operated by the user to set each function, switch a display or confirm setting are displayed with the display form changed depending on an icon mode, a regular mode and an express mode. In the icon mode, only icons for setting functions are displayed on the function selection region 2000 so that the preview region 3000 becomes the largest. In the express mode, even when the preview region 3000 becomes the smallest, a screen capable of setting functions at one time is displayed on the function selection region 2000 in a large scale. In the regular mode, the preview region 3000 has an intermediate size between the icon mode and the express mode, and an icon of function setting and a function name are displayed with text on the function selection region 2000.

The icon mode, the regular mode and the express mode are switched based on the operation of the user. That is, the size of the preview region 3000 is changed depending on an operation of the user for display. In this way, the icon is able to transmit information to the user with a small region, and is therefore preferably prepared for all functions so that the preview region 3000 is able to be displayed in a large scale.

The function selection region 2000 is provided with a change button group 2010 for changing a display style of the function selection region 2000 in its lower part. In the change button group 2010, an icon mode shift button 2012 for displaying the function selection region 2000 in the icon mode, a favorite button 2014 for displaying functions added to "favorite", a check button 2016 for displaying a function whose setting has been changed, a list button 2018 for displaying a list of all functions capable of being set in a selected operation mode, a regular mode shift button 2020 for displaying the function selection region 2000 in the regular mode, and an express mode shift button 2022 for displaying the function selection region 2000 in the express mode are arranged.

Note that, when a lot of information is displayed on the function selection region 2000, the information is displayed so as to be movable in the vertical direction on the function selection region 2000. In this case, the change button group 2010 is not moved and is always displayed on the lowest part of the function selection region 2000.

In the preview region 3000, an output (finishing) image of a document is displayed. The image is displayed with the use of dummy data or scanned data, and the image displayed on the preview region 3000 is changed every time the user changes the finishing. The preview region 3000 has two modes of finishing display with a dummy image in a virtual mode before scanning and finishing display with a real image in a scan in mode after scanning, and the virtual mode further has two kinds including before document setting and after document setting.

The preview region 3000 is provided with a preview change button group 3010 for changing a display style of the preview region 3000 in its lower part. In the preview change button group 3010, an anticlockwise rotation button 3016 for rotating a preview anticlockwise by 90 degrees, a clockwise rotation button 3018 for rotating a preview clockwise by 90 degrees, and a zoom bar 3020 are arranged. In addition thereto, for example, a color change button 3012 and a preview operation button 3014 are arranged.

Here, when the user carries out the touch operation once for the anticlockwise rotation button 3016, the preview is rotated anticlockwise by 90 degrees, and when carrying out the touch operation twice, the preview is rotated anticlockwise by 180 degrees (inverted vertically). In addition, even when a finishing document image displayed on the preview region is subjected to the gesture operation (even when the document image is rotated in an anticlockwise rotation direction by 180 degrees by the finger tip), the preview is rotated anticlockwise by 180 degrees and inverted vertically.

When the clockwise rotation button 3018 is subjected to the touch operation once, the preview is rotated clockwise by 90 degrees, and when carrying out the touch operation twice, the preview is rotated clockwise by 180 degrees (inverted vertically). In addition, even when a finishing document image displayed on the preview region is subjected to the gesture operation (even when the document image is rotated in a clockwise rotation direction by 180 degrees by the finger tip), the preview is rotated clockwise by 180 degrees and inverted vertically.

When carrying out the touch operation for a plus button 3020A of the zoom bar 3020 or the gesture operation (dragging or sliding) for a bar 3020C to the plus button 3020A side, the preview is displayed enlarged in size. In addition, even when a finishing document image displayed on the preview region is subjected to the gesture operation (even when pinching-out/pinching-open the document image with the finger tip), the preview is displayed enlarged in size.

When carrying out the touch operation for a minus button 3020B of the zoom bar 3020 or the gesture operation (dragging or sliding) for the bar 3020C to the minus button 3020B side, the preview is displayed reduced in size. In addition, even when a finishing document image displayed on the preview region is subjected to the gesture operation (even when pinching-in/pinching-close the document image with the finger tip), the preview is displayed reduced in size.

Note that, when the number of pages of the document image displayed on the preview region 3000 is large, display page selection buttons (a page number input button, a frontward page button, a backward page button, a single-page display button, a plural-pages display button and the like) capable of the touch operation may be displayed. Note that, even when the document image is slid/touched (flick operation), page forward and page backward of the document to be previewed are able to be carried out. In addition, when the document image displayed on the preview region 3000 is large, a scroll bar capable of the touch operation or the gesture operation may be displayed.

On the action panel region 4000, information related to support, advice and proposal of an operation is displayed. In the action panel region 4000, for example, when a certain user selects a specific function, functions related to the function are displayed, other functions related to the function are displayed in an object-oriented manner, or a function which has been combined and selected in the past by the user or a user of a group to which the user belongs is displayed as a "recommended function".

On the task trigger region 5000, a trigger item which is operated by the user to actually operate the image forming apparatus 100 after all settings in the operation mode is completed is displayed. An example thereof includes a start button (software button) for starting processing. Note that, in operation modes with printing (other than fax transmission), information about being out of consumables is also related to a task being inexecutable, and is therefore displayed on this "task trigger region".

In this case, only in a state where the start button is able to be pressed, it is also preferable that the start button be displayed. The state where the start button is able to be pressed is a state where all settings are finished and consumables (sheets of recording paper and toner) are not out in an operation mode involving printing and is a state where all settings of transmission parameters including a destination is finished in a fax mode (transmission) which is an operation mode without involving printing.

The arranged positions of these five regions will not be changed, even when the operation mode is changed (in an initial screen of any operation mode). In addition, like the display by switching the icon mode/the regular mode/the express mode in the function selection region 2000 (and the preview region 3000), the regions are changed in size by expanding and contracting in a lengthwise direction (longitudinal direction) of a screen of the touch panel display 130.

The five regions as such are arranged even considering a user interface in a conventional apparatus as well as focusing on a flow line of the user's viewpoint and a flow line of the operation. With such arrangement, the visual line of the user moves from the upper left to the lower right and the operation of the user (the finger tip of the dominant hand) moves from the upper left to the lower right in the touch panel display 130.

Note that, in order to shift from a certain operation mode to another operation mode, the home key 148 is pressed and another operation mode is selected in the home screen. In this way, the operation mode is switched via the home screen.

(Initial Screen Display Operation of Copy Mode)

When the copy mode is selected, an initial screen of the copy mode is displayed on the touch panel display 130 using copy initial screen data readout from the hard disc 302 or the like.

At this time, for example, on the touch panel display 130, as shown in FIG. 5, a copy mode initial screen 7100 is displayed. The copy mode initial screen 7100 is divided into five regions with the layout configuration described above for displaying information.

In the system region 1000 of the copy mode initial screen 7100, as shown in FIG. 5, an area 1102 showing an operation mode being selected (the copy mode here), an area 1104 displaying sub-information associated with the selected operation mode, an area 1106 displaying a log-in user name, an area 1108 displaying a logout button (software button), an area 1110 displaying a job state of a currently executed job, an area 1112 displaying a button (software button) related to a job state, an area 1114 displaying a communication state, and an area 1116 displaying a current time are arranged.

In the area 1102, a name or/and an icon showing the operation mode is displayed.

It is also preferable that, when the area 1102 is subjected to the touch operation, the tap operation or the double tap operation, a menu showing operation modes is displayed in the pull-down so that the operation mode is able to be switched (which is the same in other operation modes).

On the area 1104, as sub-information, an interrupt key (software button) is displayed. When the interrupt key is subjected to the touch operation, the tap operation or the double tap operation, interruption processing is able to be executed in the copy mode.

On the area 1112, the state of the currently executed job is displayed as an icon. When the job state is subjected to the touch operation, the tap operation or the double tap operation, detail job state information is displayed. Further, it is also preferable that a button for stopping the selected job or the like is displayed on the area 1112.

In the function selection region 2000 of the copy mode initial screen 7100, a function selection menu 2100 which is selectable by the user in the copy mode and the change button group 2010 described above are displayed. On the screen shown in FIG. 5, a function selection menu is displayed in the regular mode.

As shown in FIG. 5, the function selection menu displayed in the regular mode is constituted by an icon group 2100 and a text group 2120. As the function selection menu displayed on the function selection region 2000, an icon 2102 for setting the number of copies and a text 2122 for displaying a set content, an icon 2104 for setting a color mode and a text 2124 for displaying a set content, an icon 2106 for setting a copy density and a text 2126 for displaying a set content, an icon 2108 for setting a copy magnification and a text 2128 for displaying a set content, an icon 2110 for setting a type of a document and a text 2130 for displaying a set content, an icon 2112 for a type of sheets and a text 2132 for displaying a set content, an icon 2114 for editing an image and a text 2134 for displaying a set content, and an icon 2116 for editing a layout and a text 2136 for displaying a set content are displayed.

Note that, as described above, these additional items in the function setting menu are able to be displayed being capable of scrolling in the vertical direction with the display position of the change button group 2010 fixed. Then, display items of the function setting menu including items which are not displayed and hidden in the vertical direction are able to be switched by any of the touch operation (scroll operation) and the gesture operation (flick operation to the vertical direction).

Here, image editing is image editing for one-page document and lower-level menus include edge erase, a print menu, a watermark, a user stamp and the like, and layout editing is image editing for plural-pages document and lower-level menus include page aggregation, binding margin, page shift, centering and the like. Much lower menus are displayed on the touch panel display 130 when the icon 2102 to the icon 2116 or the text 2122 to the text 2136 is subjected to the touch operation, the tap operation or the double tap operation.

On the preview region 3000 of the copy mode initial screen 7100, a document output (finishing) image 3100 and the preview change button group 3010 described above are arranged. At this time, the image 3100 is displayed with the use of dummy data or scanned data, and every time the user changes the function setting menu of the function selection region 2000, the image 3100 is changed and displayed on the preview region 3000 (display of the preview is changed).

On the action panel region 4000 of the copy mode initial screen 7100, information related to support, advice and proposal of the copy operation is displayed. Here, as shown in FIG. 5, recommended functions in the copy mode selected by the user are displayed. At this time, on the action panel region 4000, an area 4100 showing contents of information displayed and areas 4102 to 4106 displaying recommended functions with text serving as software buttons by themselves.

When the area 4102 is subjected to the touch operation, the tap operation or the double tap operation, further detail information of energy-saving copy is displayed in the pull-down. For example, at this time, a software button for shifting to a function setting screen of 2-sided copy with a text of "With 2-sided printing, sheets can be saved", a software button for shifting to a function setting screen of page aggregation with a text of "When a plurality of documents are aggregated to be printed, sheets can be saved", and a software button for shifting to a function setting screen of saddle stitch with a text of "Printing is possible to be bound like a book" are displayed.

On the task trigger region 5000 of the copy mode initial screen 7100, an execution button group 5100 is displayed. As the execution button group 5100, a scan in key (software button) 5102 for causing the image forming apparatus 100 to be operated to scan a document to obtain image data, a clear all key (software button) 5104 for clearing set functions, a monochrome start key (software button) 5106 for causing the image forming apparatus 100 to be operated to scan a document to execute monochrome copy, and a color start key (software button) 5108 for causing the image forming apparatus 100 to be operated to scan a document to execute color copy are arranged.

In this way, on the copy mode initial screen 7100 which is divided into five regions to display information, when the user inputs a request, copy processing is executed in accordance with the request.

Next, description will be given for a characteristic configuration of the image forming apparatus 100 of the present embodiment with reference to drawings.

Figure 6:
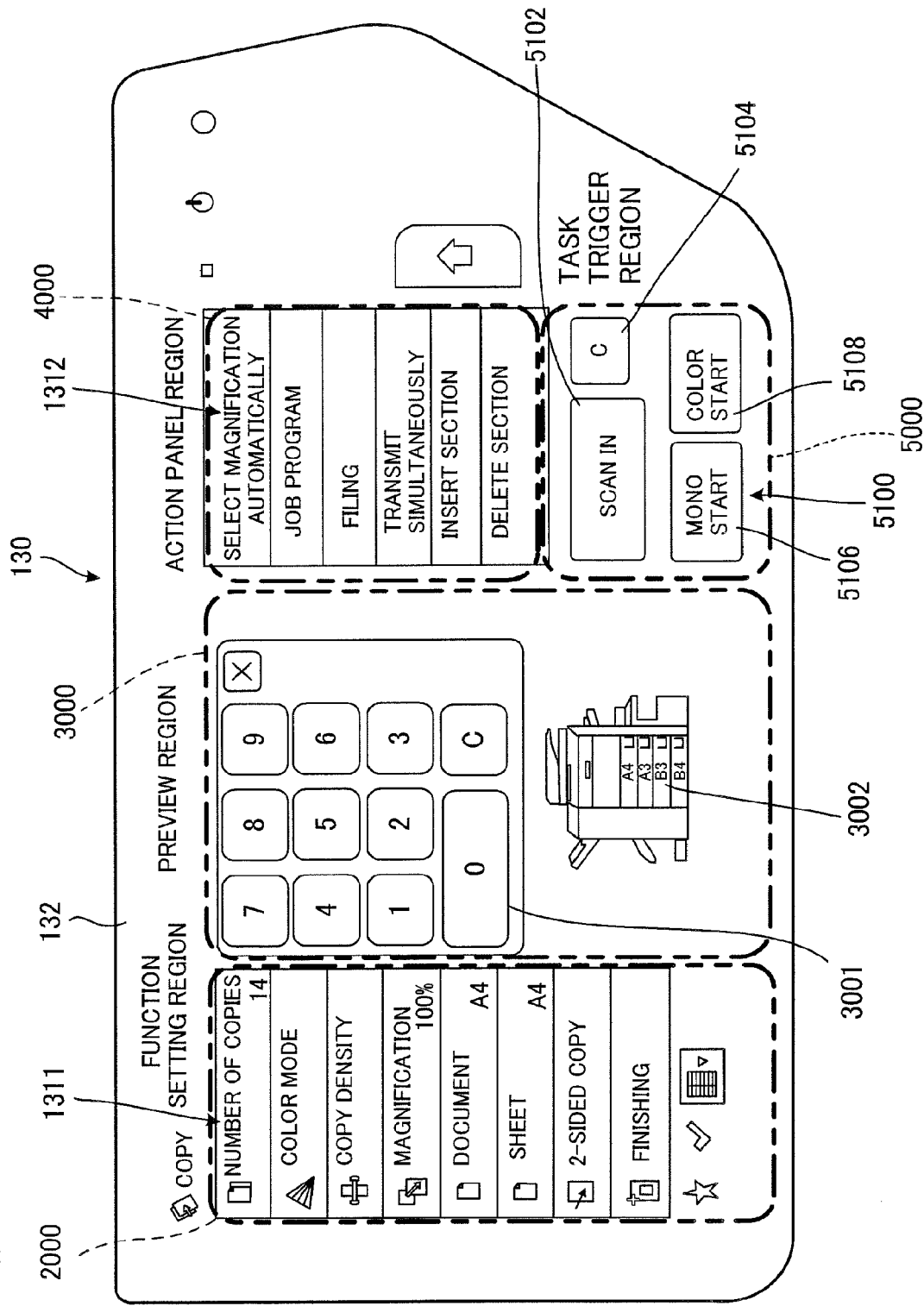
FIG. 6 is an explanatory view showing an example of a display form of a display panel constituting the touch panel display.

FIG. 6 is an explanatory view showing an example of a display form of a display panel constituting the touch panel display of the image forming apparatus of the present embodiment.

The image forming apparatus 100 of the present embodiment is such that, as shown in FIG. 6, in the touch panel display 130, the preview region 3000 is arranged in the center part of the screen and the function selection region 2000 is arranged on the left side of the preview region 3000. In addition, the action panel region 4000 is arranged in the upper right part of the preview region 3000 and the task trigger region 5000 is arranged in the lower part of the action panel region 4000.

In the preview region 3000, a virtual numeric keypad 3001 and a mimic display 3002 picturing the entire apparatus are displayed on the initial screen.

On the task trigger region 5000, the execution button group (image output instruction screen) 5100 is displayed.

As the execution button group 5100, the scan in key 5102, the clear all key 5104, the monochrome start key 5106, and the color start key 5108 are arranged.

Next, description will be given for a characteristic configuration of the operation unit 120 in the image forming apparatus 100 of the present embodiment with reference to drawings.

Figure 7:
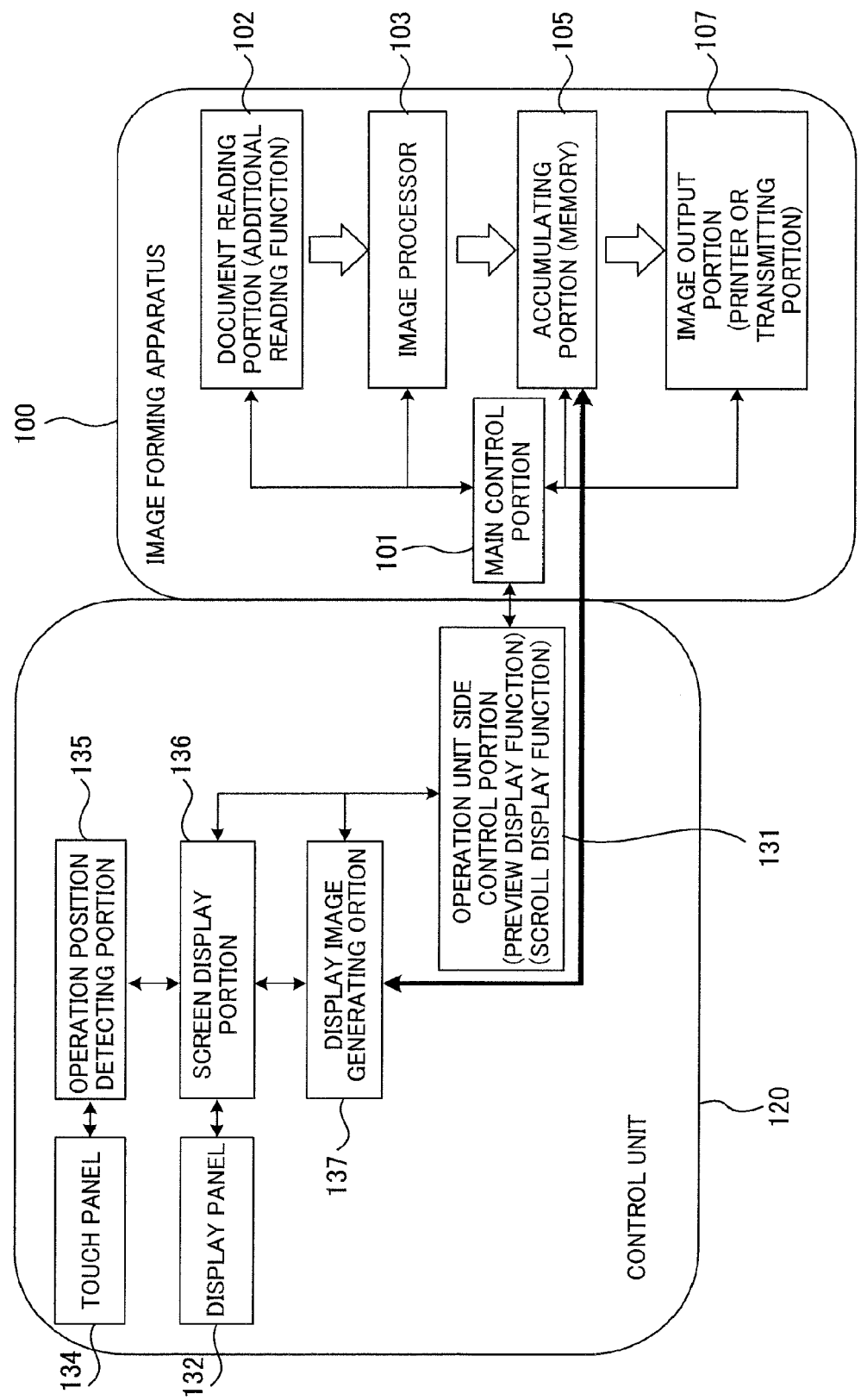
FIG. 7 is a block diagram showing a configuration of an operation unit in the image forming apparatus.
Figure 8:
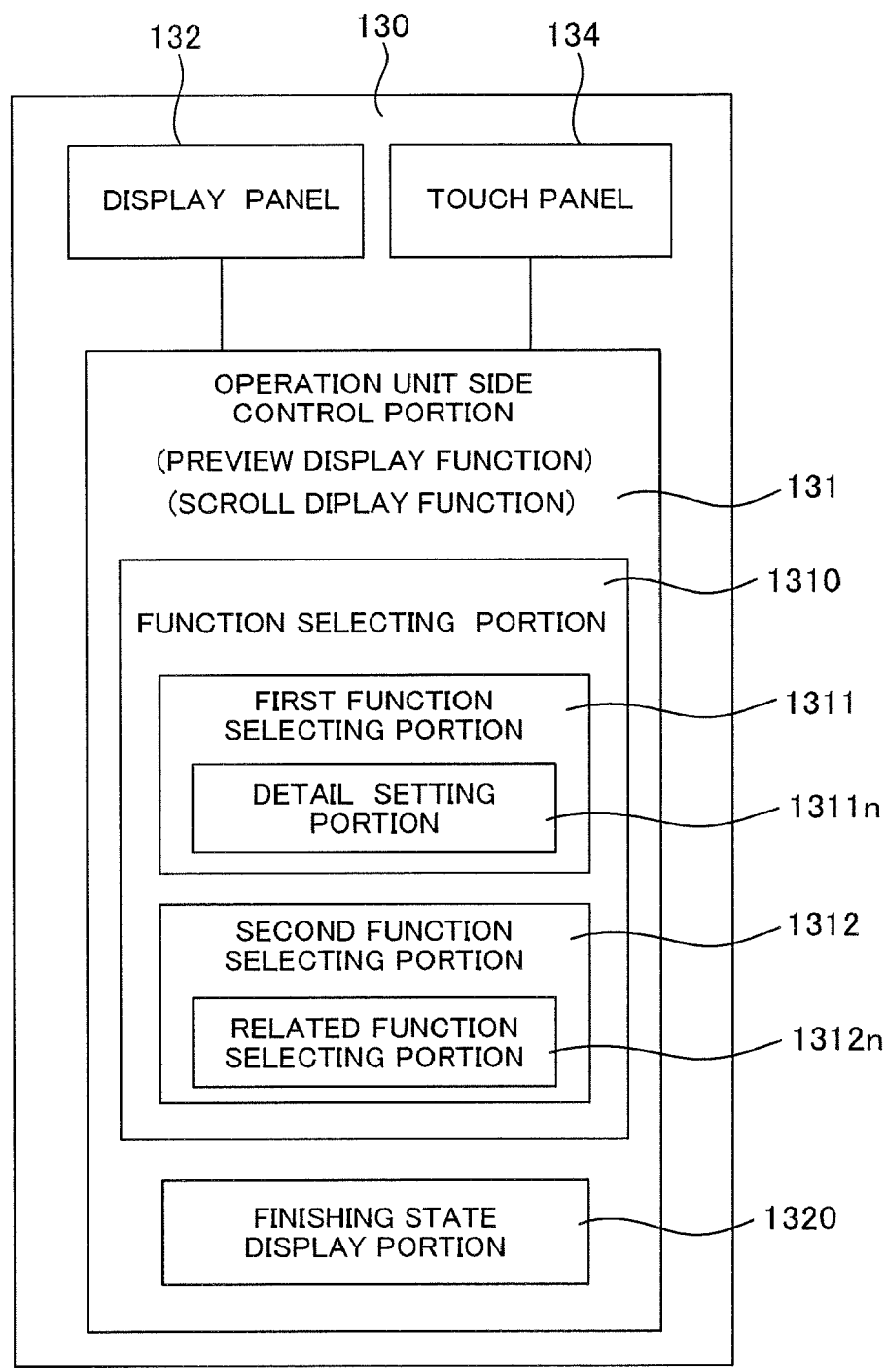
FIG. 8 is a block diagram showing a configuration of a touch panel display constituting the operation unit.

FIG. 7 is a block diagram showing a configuration of an operation unit in the image forming apparatus of the present embodiment, and FIG. 8 is a block diagram showing a configuration of a touch panel display constituting the operation unit.

The operation unit 120 according to the present embodiment is provided with, as shown in FIG. 7, an operation position detecting portion 135, a screen display portion 136, a display image generating portion 137 and an operation unit side control portion (display control portion) 131 for controlling processing and operations in the operation unit 120, in addition to the display panel 132 and the touch panel 134.

The image forming apparatus 100 is provided with the document reading portion 102 for inputting image data, an image processing portion 103, an accumulating portion 105 for accumulating image data input from the document reading portion 102, and an image output portion 107 for outputting images of a printer, a transmitting portion and the like, and is operated under the control of a main control portion 101.

The document reading portion 102 is provided with an additional reading function capable of, after finishing reading of a desired document (image data), additionally reading (additionally inputting) a further new document.

The operation position detecting portion 135 detects a position of the operation carried out on the touch panel 134.

The image display portion 136 displays an image formed by the display image generating portion 137 on the display panel 132.

The display image generating portion 137 is provided with a function of forming a prescribed image depending on an instruction from the operation unit side control portion 131 based on image data input to a main body of the image forming apparatus 100 as well as forming an image in a finishing state in accordance with the setting of finishing processing.

The operation unit side control portion 131 is connected to the main control portion 101 of the main body of the image forming apparatus 100 and functions as a control portion in the touch panel display 130.

Here, description will be given for the characteristic operation unit side control portion 131 in detail.

The operation unit side control portion 131 is provided with, as shown in FIG. 8, a preview display function of displaying a preview of a display image based on a document read from the document reading portion 102 on the touch panel display 130 and a scroll display function of moving and displaying plural-pages display images displayed for previewing.

Further, the operation unit side control portion 131 is provided with a function selecting portion 1310 associated with a plurality of functions executed in the image forming apparatus so as to be executable. In addition, the operation unit side control portion 131 is provided with a function of causing the display panel 132 to display the function selecting portion 1310.

The function selecting portion 1310 is provided with a first function selecting portion 1311 in which selectable function items are displayed in accordance with an operation mode selected in the image forming apparatus 100 and a second function selecting portion 1312 in which other function items which are selectable at the same time other than functions according to the first function selecting portion 1311.

The first function selecting portion 1311 is associated with functions of setting finishing processing so as to be executable. In addition, a detail setting portion 1311n associated with functions related to respective functions of the first function selecting portion 1311 so as to be executable is provided.

The second function selecting portion 1312 is associated with functions related to functions of setting finishing processing so as to be executable. In addition, functions related to functions according to the first function selecting portion 1311 are associated so as to be executable. Further, a related function selecting portion 1312n associated with functions related to respective functions of the detail setting portion 1311n of the first function selecting portion 1311 so as to be executable is provided.

Further, the operation unit side control portion 131 is provided with a function of displaying the first function selecting portion 1311 and the second function selecting portion 1312 at the same time on the display panel 132 as shown in FIG. 6. In addition, it is configured such that functions selectable by the first function selecting portion 1311 and functions selectable by the second function selecting portion 1312 are selectable at the same time.

Moreover, the operation unit side control portion 131, when a specific function is selected in the first function selecting portion 1311, displays the detail setting portion associated with the specific function on the display panel 132, and when a specific function is selected in the first function selecting portion 1311, switches the second function selecting portion 1312 to the related function selecting portion associated with the specific function for displaying.

Further, when a specific function is selected in the related function selecting portion, the operation unit side control portion 131 displays the detail setting portion associated with the specific function on the display panel 132.

In addition, the operation unit side control portion 131 is provided with a finishing state display portion 1320 for displaying a finishing state of an image based on a function of setting finishing processing and is provided with a function of displaying the finishing state of the image by the finishing state display portion 1320 as well as displaying the second function selecting portion 1312.

Further, the operation unit side control portion 131 is provided with a function of reflecting processing based on a function selected from functions related to functions of setting finishing processing in the second function selecting portion 1312 to an image displayed by the finishing state display portion 1320.

Moreover, the operation unit side control portion 131 is configured so as to display the execution button group (image output instructing portion) 5100 in the close vicinity of the second function selecting portion 1312 when a finishing state of an image is displayed by the finishing state display portion.

Next, description will be given for the first function selecting portion 1311 displayed on the function selection region 2000 and the second function selecting portion 1312 displayed on the action panel region 4000 on the touch panel display 130 of the image forming apparatus 100.

As shown in FIG. 6, the initial screen of the copy mode has the first function selecting portion 1311 in which operation keys associated with functions of setting each of a plurality of functions, specifically, including the number of copies, a color mode, a copy density, a magnification, a document size, a sheet size, 2-sided copy, and staple (finishing processing) are displayed from the upper side to the lower side of the function selection region 2000 as a function selection menu screen.

The second function selecting portion 1312 displays operation keys associated with a plurality of functions from the upper side to the lower side of the action panel region 4000 as a menu screen for selecting functions related to a function specified in the first function selecting portion 1311.

Here, description will be given for a display content of the second function selecting portion 1312 which is displayed on the action panel region 4000 by taking examples.

FIGS. 9A to 9E are explanatory views showing an example of items of a second function selecting portion displayed on an action panel region of a touch panel display in the image forming apparatus of the present embodiment.

A second function selecting portion 1312a related to the "color mode" in the first function selecting portion 1311 includes selection items of "add to favorite", "2-sided copy", "page aggregation", "staple", "binding margin", and "edge erase" as shown in FIG. 9A.

A second function selecting portion 1312b related to the "2-sided copy" in the first function selecting portion 1311 includes selection items of "add to favorite", "edit mode, designate chapter division", "page aggregation", "binding margin", "staple", "color mode", and "skip blank sheet" as shown in FIG. 9B.

In FIGS. 9A and 9B, items indicated with a reference letter A are functions assumed to be frequently used to focus on reducing the number of operations.

Items indicated with a reference letter B are functions which are convenient when used jointly to suggest how to use for a user.

An item indicated with a reference letter C is a "recommended function" to call user's attention to presence of the function.

Additionally, as shown in FIG. 9B, an item positioned below a display range line D is arranged on a next page (second page). That is, due to a size of the action panel region 4000, displayable items are to be limited. Accordingly, an item which is not displayable may be scrolled to turn up by scroll display.

As another example, a second function selecting portion 1312c related to "binding margin" includes selection items of "add to favorite", "staple", "punch", "2-sided copy", "sheet", and "suppress background" as shown in FIG. 9C.

In FIG. 9C, items indicated with a reference letter c1 are functions having a strong mechanical relation to each other, and when the binding margin is selected, it is assumed that sheets are likely to be put together after printing, and the staple or the punch are likely to be used. Accordingly, consideration is given for enabling a smooth operation by having a configuration in which functions with a close functional relation are arranged next to each other.

Moreover, a second function selecting portion 1312*d* related to "cover/index paper" includes selection items of "add to favorite", "page aggregation", "staple", "2-sided copy", "color mode", and "binding margin" as shown in FIG. 9D.

In FIG. 9D, items indicated with a reference letter d1 are for calling attention to new functions, which were conventionally not able to be combined with the "cover/index paper" function, however, setting becomes possible with such a configuration. Therefore, it is aimed to call conventional user's attention to addition of the new functions.

In addition, a second function selecting portion 1312*e* related to "count the number of documents" includes selection items of "add to favorite", "skip blank sheet", "job build mode", "2-sided copy", "print page number", and "document size" as shown in FIG. 9E.

In FIG. 9E, an item indicated with a reference letter e1 is for turning on/off a function with a touch operation, and it is possible to turn on/off a function of the "job build mode" without shifting to another screen.

Moreover, an item indicated with a reference letter e2 is for shifting to a child function. This item shifts to the child function although most items are for shifting to a parent function. A parent function indicates shifting to a top screen of a function. Here, a not-shown screen related to "print menu" is a parent function. A child function indicates a small item in the function. Here, an item of "print page number" in the screen related to the "print menu" is a child function.

That is, setting of items of the second function selecting portion 1312 is configured so as to jump not only to a parent function, but also even to jump to a child function in the parent function, thereby it is possible to reduce the number of touches to a large extent and to call attention to presence of a function which is deep in a layer. This recommends a function included in the image forming apparatus 100 to a user so that setting and an operation are more easily performed.

Next, description will be given for switch display of the second function selecting portion 1312 which is displayed on the action panel region 4000 taking examples.

FIG. 10A is an explanatory view showing an example of items in an initial state of a second function selecting portion which is displayed on an action panel region of a touch panel display in a copy mode of the image forming apparatus of the present embodiment, and (b) is an explanatory view showing an example of items of the second function selecting portion enabling to reduce operation procedures by displaying convenient functions after 2-sided copy is selected and set in the copy mode of the image forming apparatus.

First, description will be given for switching from a normal menu screen in an initial state to a menu screen enabling few operation procedures with convenient functions displayed.

A menu screen in an initial state of a second function selecting portion 1312(*a*) on the touch panel display 130 in the copy mode of the image forming apparatus 100 includes items of "select magnification automatically" (a)1, "call program" (a)2, "transmit simultaneously with printing" (a)3, "quick file" (a)4, "filing" (a)5, "call setting" (a)6, "eco program" (a)7, "how to save sheet?" (a)8, "what is preview?" (a)9, and "how to confirm setting?" (a)10 as shown in FIG. 10A.

In the copy mode of the image forming apparatus 100, a menu screen of a second function selecting portion 1312(*b*) after 2-sided copy is selected and set in the copy mode of the image forming apparatus 100 is switched to items of "rotate rear surface 180 degrees" (b)1, "select magnification automatically" (a)1, "register program" (b)2, "transmit simultaneously with printing" (a)3, "quick file" (a)4, and "filing" (a)5 as shown in FIG. 10B.

That is, in the menu screen of the second function selecting portion 1312(*b*) after 2-sided copy is selected and set, items of "call program" (a)2, "call setting" (a)6, "eco program" (a)7, "how to save sheet?" (a)8, "what is preview?" (a)9, and "how to confirm setting?" (a)10 in the menu screen of the second function selecting portion 1312 (*a*) in an initial state are deleted, and items of "rotate rear surface 180 degrees" (b)1 and "register program" (b)2 are added.

A function of "rotate rear surface 180 degrees" (b)1, or specifically to "rotate orientation of rear surface 180 degrees" is a function which is effective when reading setting is erroneously set in reading a document and rear surface of the read document is oppositely oriented, for example. Accordingly, an operation is assisted by displaying "rotate rear surface 180 degrees" (b)1 when 2-sided copy is set to call user's attention to presence of the function, and it is possible to realize a simple operation in which an operation is able to be performed without shifting between menu screens by turning on/off the function by one touch.

In this way, the function of "rotate rear surface 180 degrees" (b)1 is a convenient function, but originally a function which is not operable unless the item of "2-sided copy" is selected from the menu screen which is displayed on the function selection region 2000 and pressed to display a 2-sided copy dialogue (not shown), and a function which is buried in a layer and thus hardly noticed.

Then, by adding the item of "rotate rear surface 180 degrees" (b)1 to the menu screen of the second function selecting portion 1312(*b*) as shown in FIG. 10B, it becomes possible to execute a convenient function with few operations.

Next, description will be given for switching from a normal menu screen in an initial state to a menu screen in which an unnecessary function is deleted to display a necessary function.

FIG. 11A is an explanatory view showing an example of items in an initial state of a second function selecting portion which is displayed on an action panel region of a touch panel display in the copy mode of the image forming apparatus of the present embodiment, and (b) is an explanatory view showing an example of items of the second function selecting portion in which an unnecessary item is deleted to add and display a necessary item after 2-sided copy is selected and set in the copy mode of the image forming apparatus.

A menu screen in an initial state of the second function selecting portion 1312(*a*) on the touch panel display 130 in the copy mode of the image forming apparatus 100 includes items of "select magnification automatically" (a)1, "call program" (a)2, "transmit simultaneously with printing" (a)3, "quick file" (a)4, "filing" (a)5, "call setting" (a)6, "eco program" (a)7, "how to save sheet?" (a)8, "what is preview?" (a)9, and "how to confirm setting?" (a)10 as shown in FIG. 11A.

When setting is changed in the copy mode of the image forming apparatus 100, a menu screen of a second function selecting portion 1312(*c*) after changing the setting is switched to items of "select magnification automatically" (a)1, "register program" (c)1, "transmit simultaneously with printing" (a)3, "quick file" (a)4, "filing" (a)5, "call setting" (a)6, "eco program" (a)7, "how to save sheet?" (a)8, "what is preview?" (a)9, and "how to confirm setting?" (a)10 as shown in FIG. 11B.

That is, on the menu screen of the second function selecting portion 1312(*c*), an item of "call program" becomes impossible, and "register program" goes into a possible state. Accordingly, the menu screen is clarified by deleting unnecessary "call program" (a)2 to add and display necessary "register program" (c)1.

Next, description will be given for a case where image data is output in the copy mode in the image forming apparatus 100 of the present embodiment based on examples with reference to drawings.

Example 1

In an example 1, a 1-sided document is output in 2-sided copying in the image forming apparatus 100.

Figure 12:
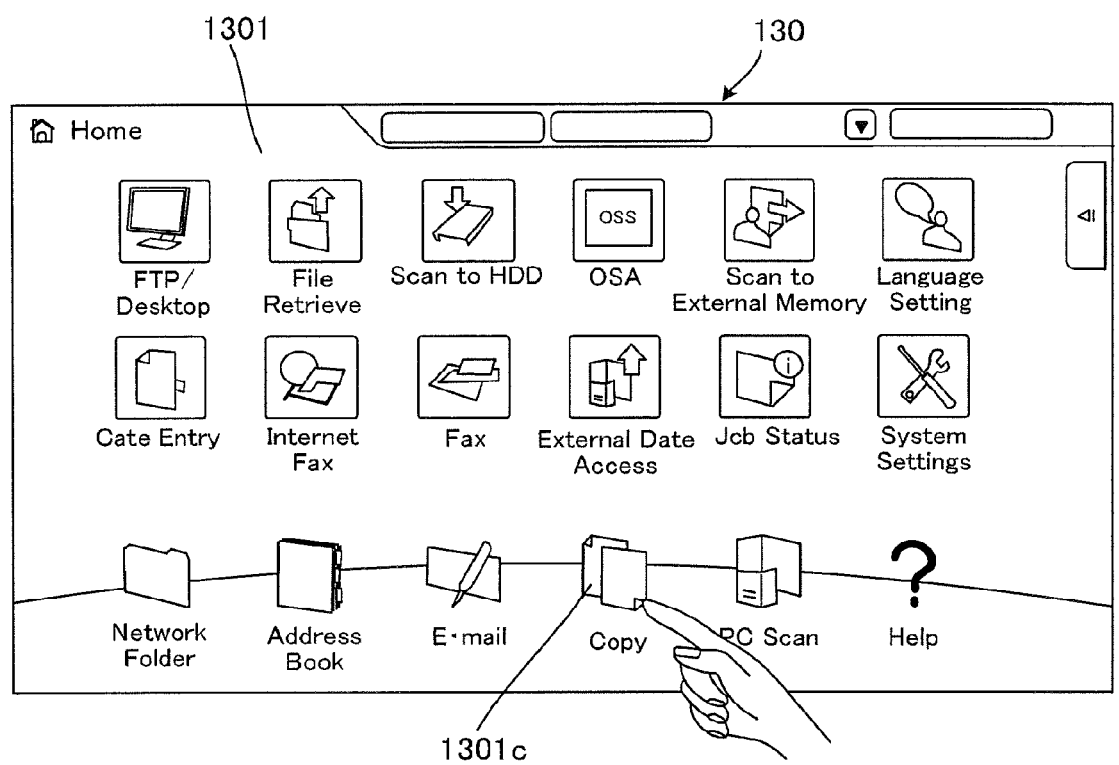
FIG. 12 is an explanatory view showing an example of a home screen on which mode selection is performed in an image forming apparatus of an example 1.
Figure 13:
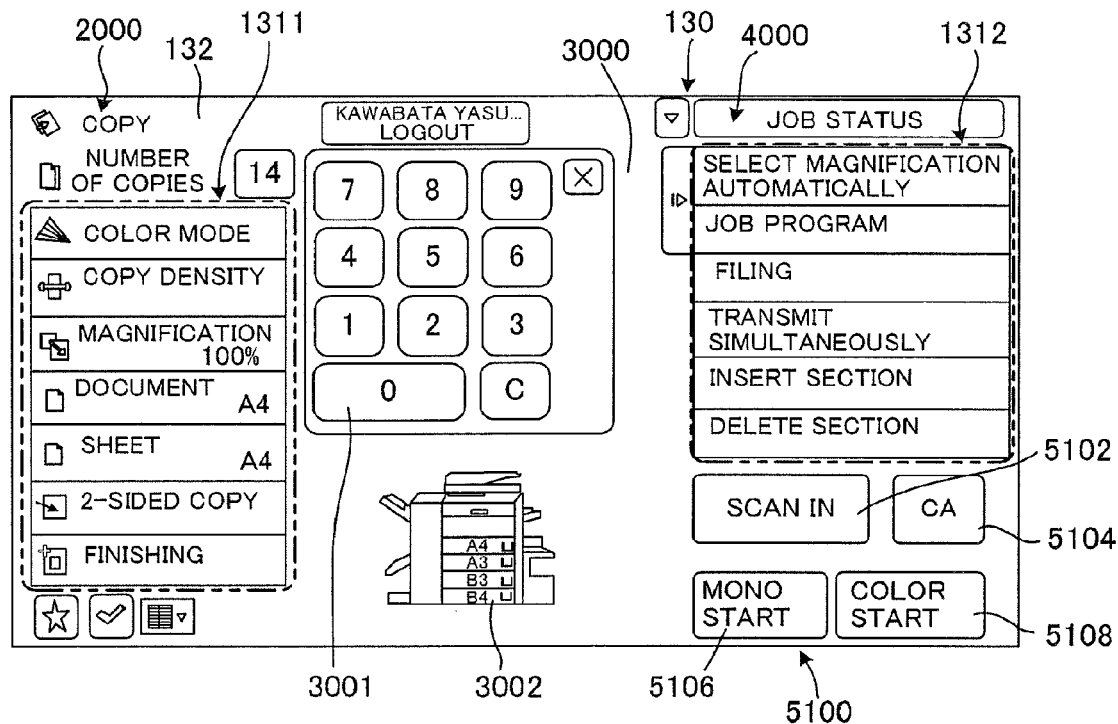
FIG. 13 is an explanatory view showing an initial screen of the copy mode in the image forming apparatus.
Figure 14:
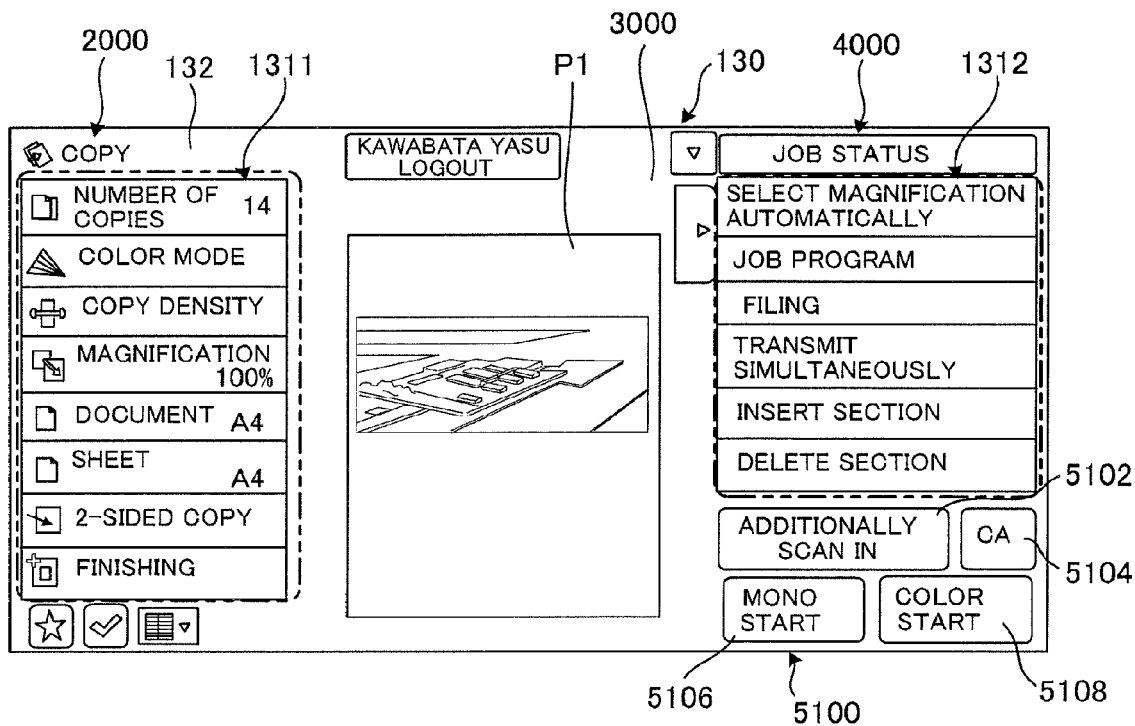
FIG. 14 is an explanatory view showing an initial screen in the copy mode after document reading is finished in the image forming apparatus.
Figure 15:
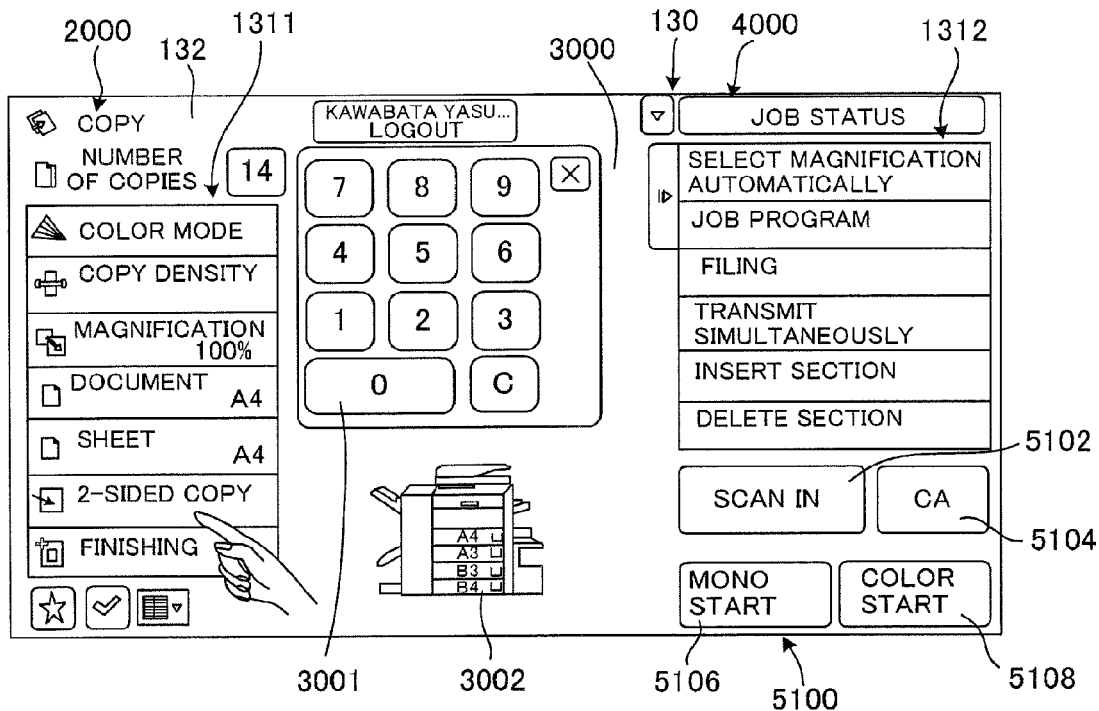
FIG. 15 is an explanatory view showing a display screen when 2-sided copy is selected in the copy mode of the image forming apparatus.
Figure 16:
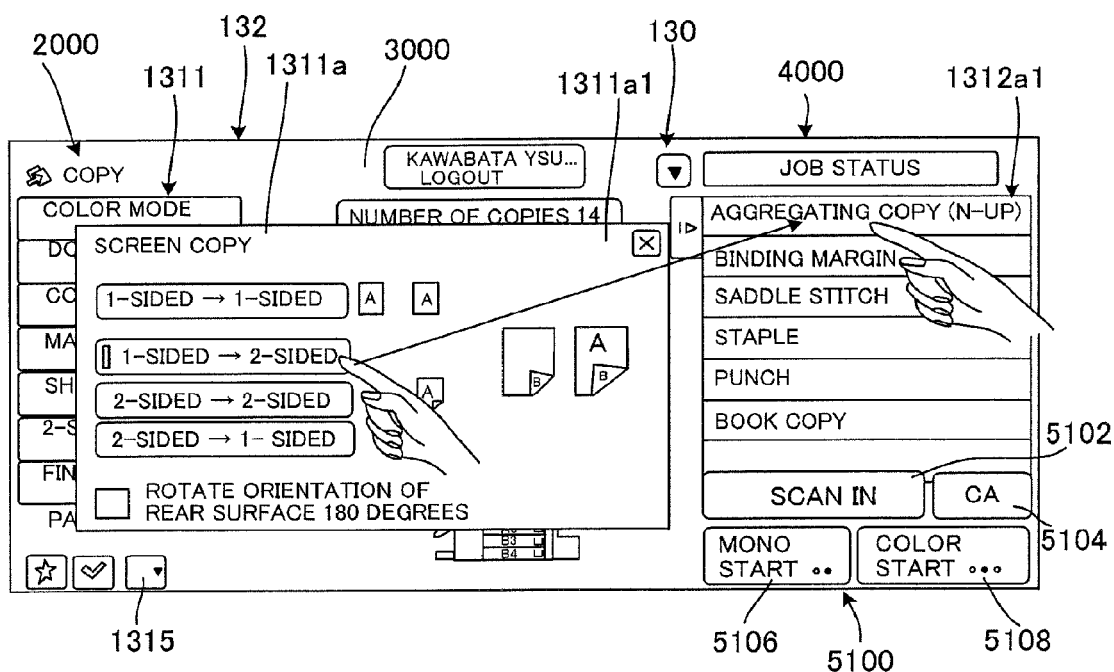
FIG. 16 is an explanatory view showing a state where a detail setting screen and a related function selection screen related to 2-sided copy are displayed after 2-sided copy is selected in the image forming apparatus.
Figure 17:
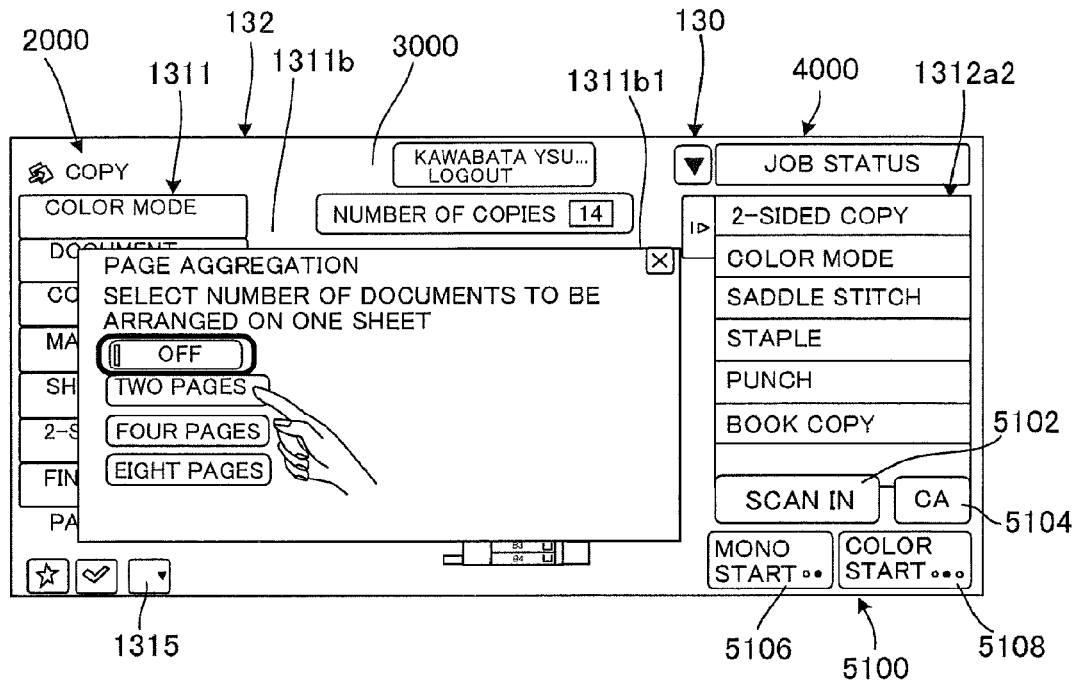
FIG. 17 is an explanatory view showing a state where a detail setting screen related to aggregating copy is displayed after aggregating copy is selected in the related function selection screen.
Figure 18:
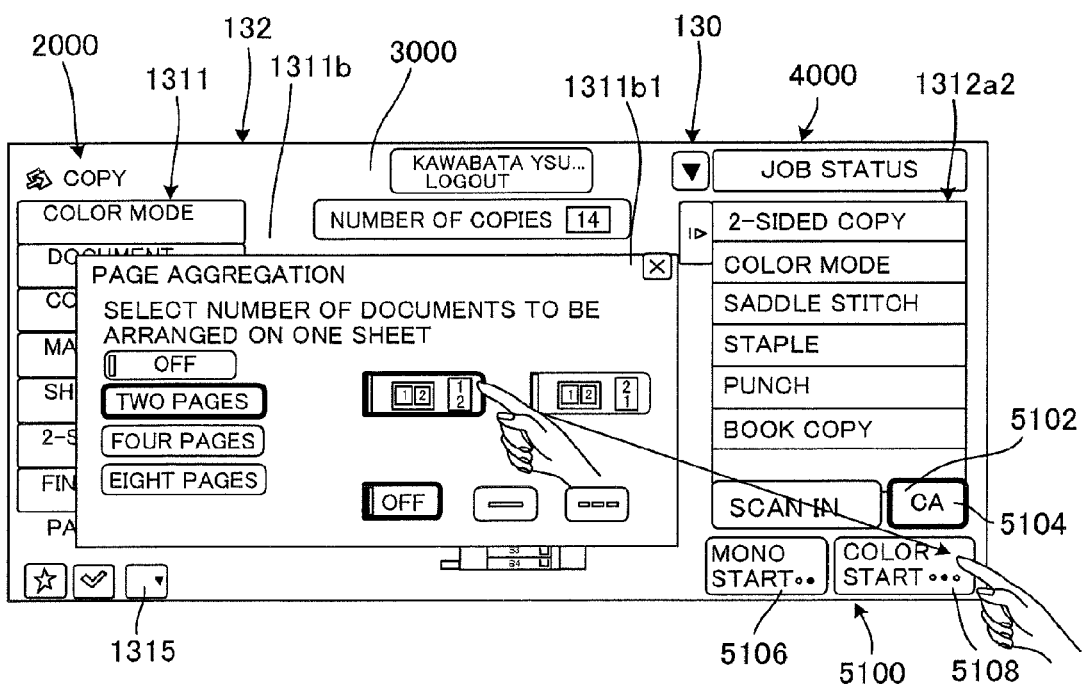
FIG. 18 is an explanatory view showing a state where, after an output form is selected in the detail setting screen related to aggregating copy, layouts of a finish image in accordance with the output form are displayed.

FIG. 12 is an explanatory view showing an example of a home screen on which mode selection is performed in the image forming apparatus of the example 1, FIG. 13 is an explanatory view showing an initial screen of the copy mode in the image forming apparatus, FIG. 14 is an explanatory view showing an initial screen in the copy mode after document reading is finished in the image forming apparatus, FIG. 15 is an explanatory view showing a display screen when 2-sided copy is selected in the copy mode of the image forming apparatus, FIG. 16 is an explanatory view showing a state where a detail setting screen and a related function selection screen related to 2-sided copy are displayed after 2-sided copy is selected in the image forming apparatus, FIG. 17 is an explanatory view showing a state where a detail setting screen related to aggregating copy is displayed after aggregating copy is selected in the related function selection screen, and FIG. 18 is an explanatory view showing a state where, after an output form is selected in the detail setting screen related to aggregating copy, layouts of a finish image in accordance with an output form are displayed.

When copy is made in the image forming apparatus 100, an icon of Copy 1301*c* is selected on a home screen 1301 which is displayed on the touch panel display 130 as shown in FIG. 12.

When the icon of Copy 1301*c* is selected in the image forming apparatus 100, the image forming apparatus 100 enters the copy mode, and on the touch panel display 130, as shown in FIG. 13, the first function selecting portion 1311 on which functions related to the copy mode are displayed is displayed on the function selection region 2000 arranged on the left side of the screen, while the second function selecting portion 1312 on which items of other functions which are selectable at the same time other than functions according to the first function selecting portion 1311 are displayed, is displayed on the action panel region 4000 arranged on the right side of the screen. On the preview region 3000 in the center part of the screen, the virtual numerical keypad 3001 and the mimic display 3002 picturing an entire apparatus are displayed on an initial screen.

At this time, in a case where image data has already been input in the image forming apparatus 100, an image P1 based on the read image data is displayed for previewing on the preview region 3000 as shown in FIG. 14.

The first function selecting portion 1311 includes selection items of "color mode", "copy density", "magnification", "document size", "sheet size", "2-sided copy", and "finishing".

The second function selecting portion 1312 includes selection items of "select magnification automatically", "job program", "filing", "transmit simultaneously", "insert section" and "delete section".

Then, when 2-sided copy is selected from the selection items of the first function selecting portion 1311 as shown in FIG. 15, a 2-sided copy function detail setting screen (detail setting portion) 1311*a* associated with functions related to the function of 2-sided copy is displayed so as to be overlaid in front of the function selection region 2000 and the preview region 3000 as shown in FIG. 16.

At this time, on the action panel region 4000, in place of the second function selecting portion 1312, a first related function selection screen (related function selecting portion) 1312*a*1 associated with the function of 2-sided copy is displayed.

The 2-sided copy function detail setting screen 1311*a* includes selection items of "1-sided→1-sided", "1-sided→2-sided", "2-sided→2-sided", "2-sided→1-sided" and "rotate rear surface 180 degrees", and a preview region 1311*a*1.

The first related function selection screen 1312*a*1 includes selection items of "aggregating copy", "binding margin", "saddle stitch", "staple", and "punch".

When a 1-sided document is output in 2-sided copying, "1-sided→2-sided" is selected on the 2-sided copy function detail setting screen 1311*a* as shown in FIG. 16. At this time, a finishing state of an image which is output is displayed for previewing on the preview region 1311*a*1 of the 2-sided copy function detail setting screen 1311*a*.

When "aggregating copy" is selected on the first related function selection screen 1312*a*1 as shown in FIG. 16, a page aggregation function detail setting screen 1311*b* is displayed in front of the function selection region 2000 and the preview region 3000, and in place of the first related function selection screen 1312*a*1, a second related function selection screen (related function selecting portion) 1312*a*2 is displayed as shown in FIG. 17.

The page aggregation function detail setting screen 1311*b* includes selection items of "OFF", "two pages", "four pages" and "eight pages", and a preview region 1311*b*1.

The second related function selection screen 1312*a*2 includes selection items of "2-sided copy", "color mode", "saddle stitch", "staple", and "punch".

Then, when "two pages" is selected on the page aggregation function detail setting screen 1311*b*, a plurality of patterns of page layouts corresponding to the two pages (2 in 1) are displayed on the preview region 1311*b*1 of the page aggregation function detail setting screen 1311*b* as shown in FIG. 18.

Next, a specific pattern is selected from the plurality of page layouts and the color start key 5108 is operated by touch so that color copy is executed.

In this way, copying in the copy mode is set and executed.

Example 2

In an example 2, a 2-sided document is output in 2-sided copying in the image forming apparatus 100.

Figure 19:
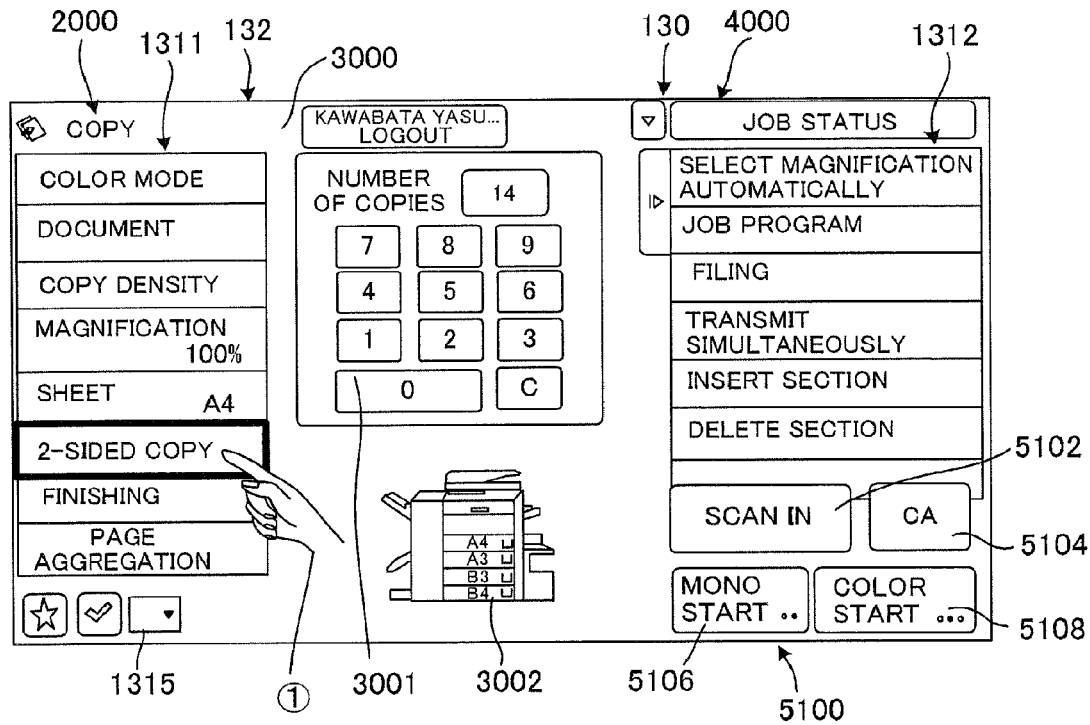
FIG. 19 is an explanatory view showing a display screen when 2-sided copy is selected in a copy mode of an image forming apparatus of an example 2.
Figure 20:
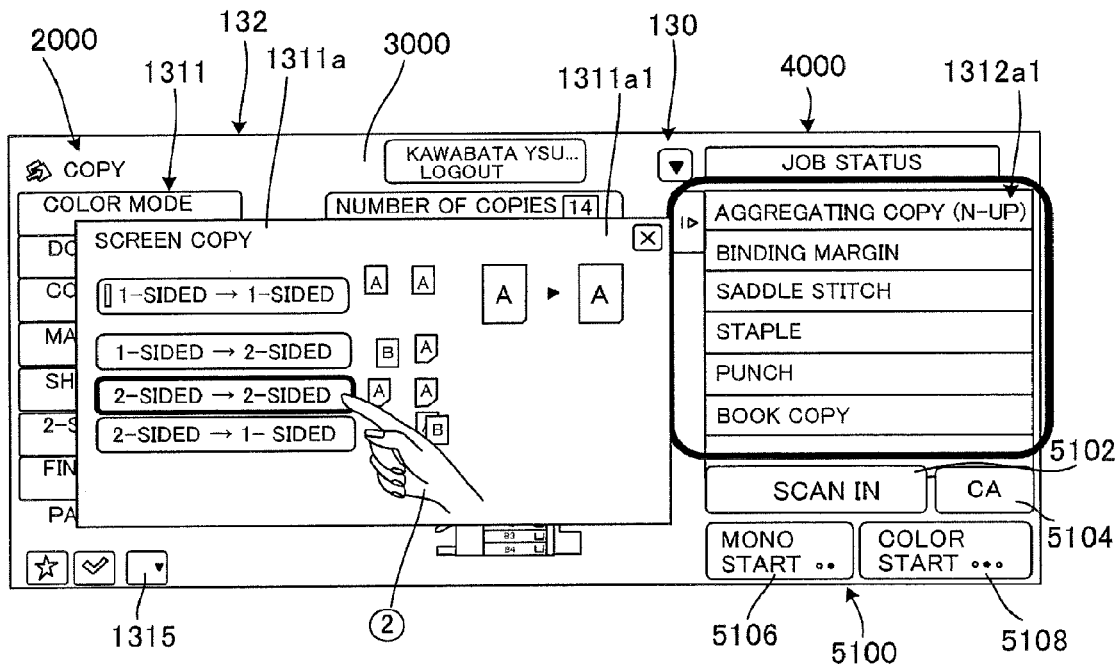
FIG. 20 is an explanatory view showing a state where a detail setting screen and a related function selection screen related to 2-sided copy are displayed after 2-sided copy is selected in the image forming apparatus.
Figure 21:
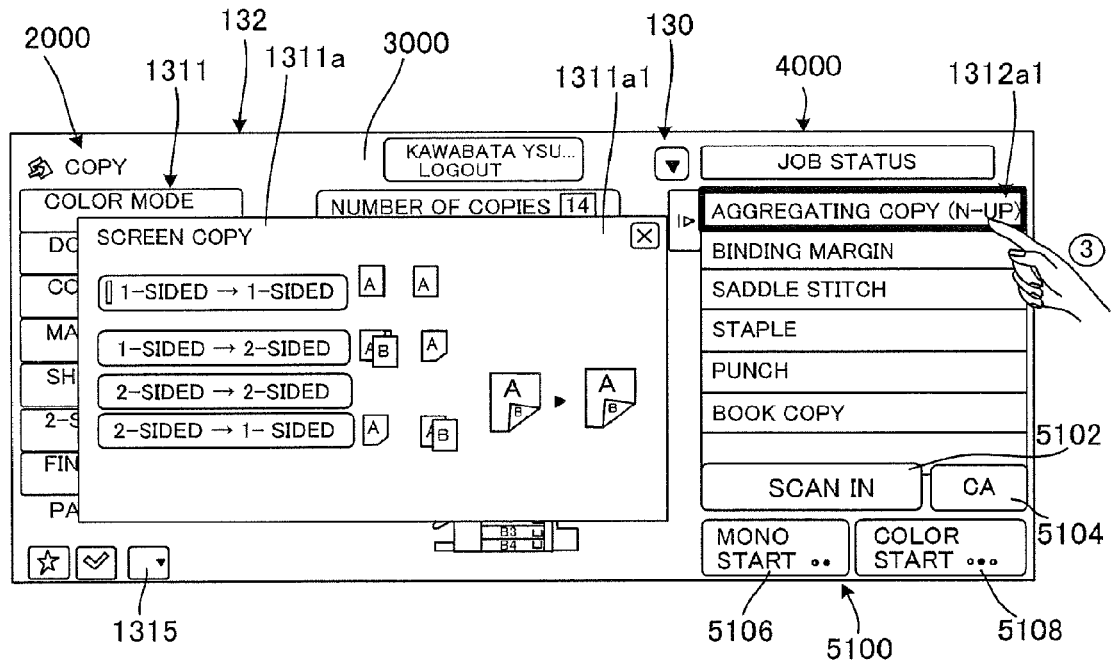
FIG. 21 is an explanatory view showing a state where an image of 2-sided copy is displayed for previewing on the detail setting screen.
Figure 22:
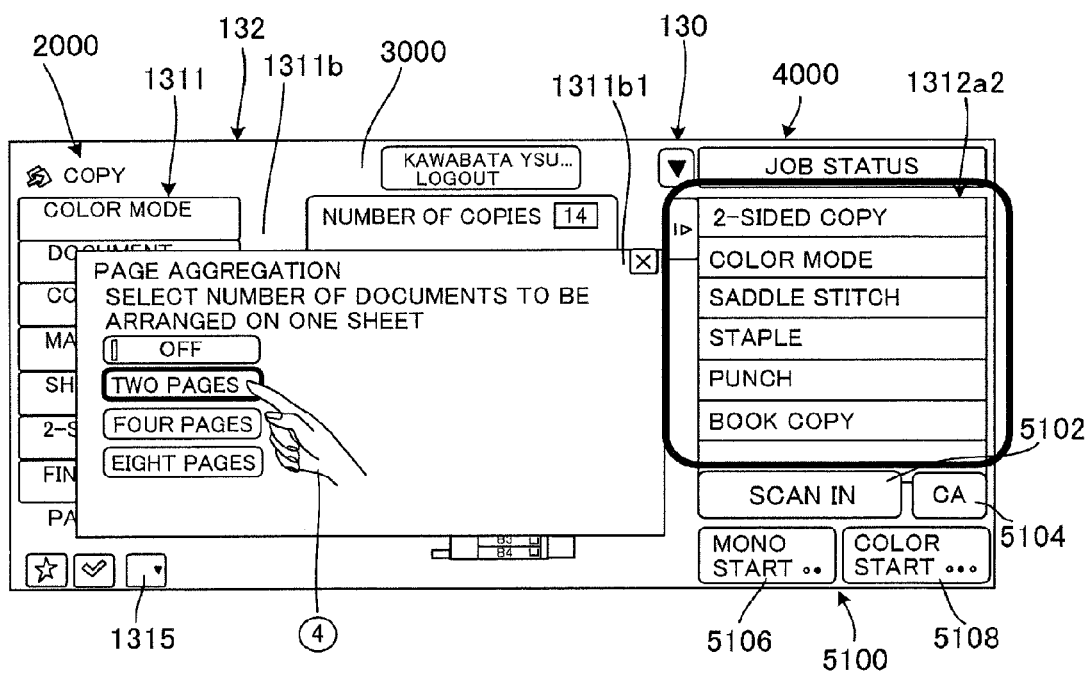
FIG. 22 is an explanatory view showing a state where a detail setting screen related to aggregating copy is displayed after aggregating copy is selected in the related function selection screen.
Figure 23:
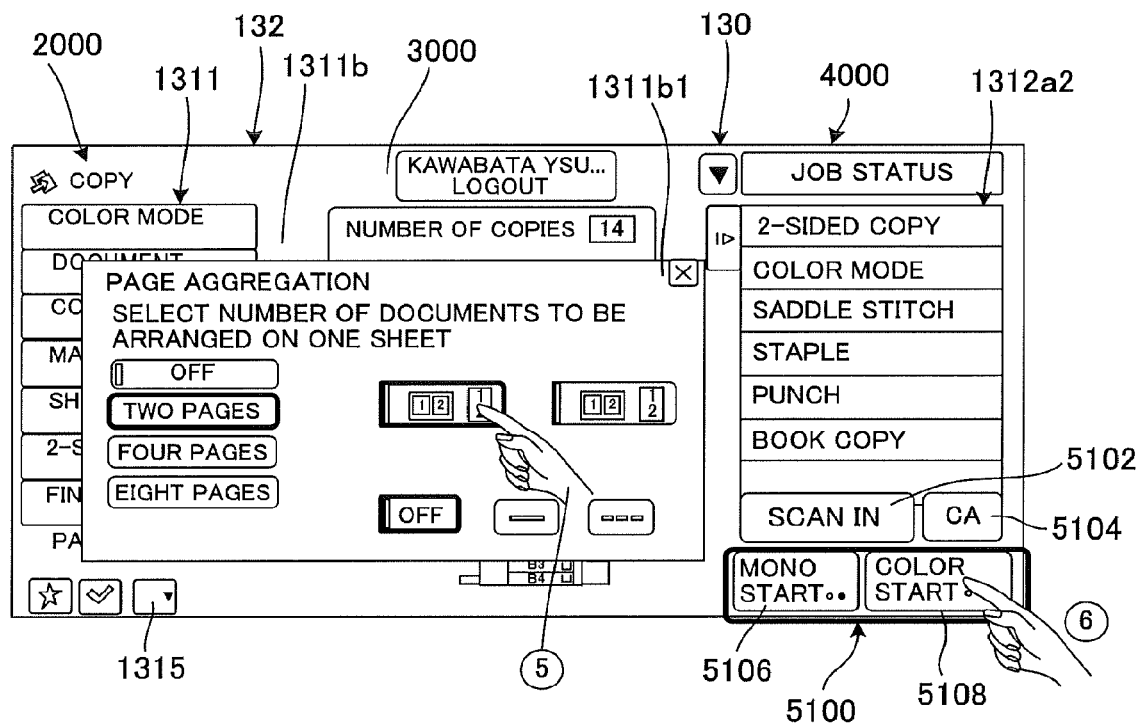
FIG. 23 is an explanatory view showing a state where, after an output form is selected in the detail setting screen related to aggregating copy, layouts of a finish image in accordance with the output form are displayed.

FIG. 19 is an explanatory view showing a display screen when 2-sided copy is selected in a copy mode of an image forming apparatus of the example 2, FIG. 20 is an explanatory view showing a state where a detail setting screen and a related function selection screen related to 2-sided copy are displayed after 2-sided copy is selected in the image forming apparatus, FIG. 21 is an explanatory view showing a state where an image of 2-sided copy is displayed for previewing on the detail setting screen, FIG. 22 is an explanatory view showing a state where a detail setting screen related to aggregating copy is displayed after aggregating copy is selected in the related function selection screen, and FIG. 23 is an explanatory view showing a state where, after an output form is selected in the detail setting screen related to aggregating copy, layouts of a finish image in accordance with the output form are displayed.

In a case where 2-sided copy is performed in the image forming apparatus 100, when 2-sided copy is selected from the selection items of the first function selecting portion 1311 on a screen in the copy mode as shown in FIG. 19, the 2-sided copy function detail setting screen 1311a associated with functions related to the function of 2-sided copy is displayed so as to be overlaid in front of the function selection region 2000 and the preview region 3000 as shown in FIG. 20.

At this time, on the action panel region 4000, in place of the second function selecting portion 1312, a first related function selection screen 1312a1 associated with the function of 2-sided copy is displayed.

When a 2-sided document is output in 2-sided copying, "2-sided→2-sided" is selected on the 2-sided copy function detail setting screen 1311a as shown in FIG. 20. At this time, a finishing state of an image which is output is displayed for previewing on the preview region 1311a1 of the 2-sided copy function detail setting screen 1311a as shown in FIG. 21.

When "aggregating copy" is selected on the first related function selection screen 1312a1 as shown in FIG. 21, the page aggregation function detail setting screen 1311b is displayed in front of the function selection region 2000 and the preview region 3000, and in place of the first related function selection screen 1312a1, the second related function selection screen 1312a2 is displayed as shown in FIG. 22.

When "two pages" is selected on the page aggregation function detail setting screen 1311b, a plurality of patterns of page layouts corresponding to the two pages (2 in 1) are displayed on the preview region 1311b1 of the page aggregation function detail setting screen 1311b as shown in FIG. 23.

Next, a specific pattern is selected from the plurality of page layouts and the color start key 5108 is operated by touch so that color copy is executed.

In this way, copying in the copy mode is set and executed.

Comparative Example

Next, as a comparative example, description will be given for a case where image data is output in the copy mode by a conventional and general operation in the image forming apparatus 100 with reference to drawings.

Figure 24:
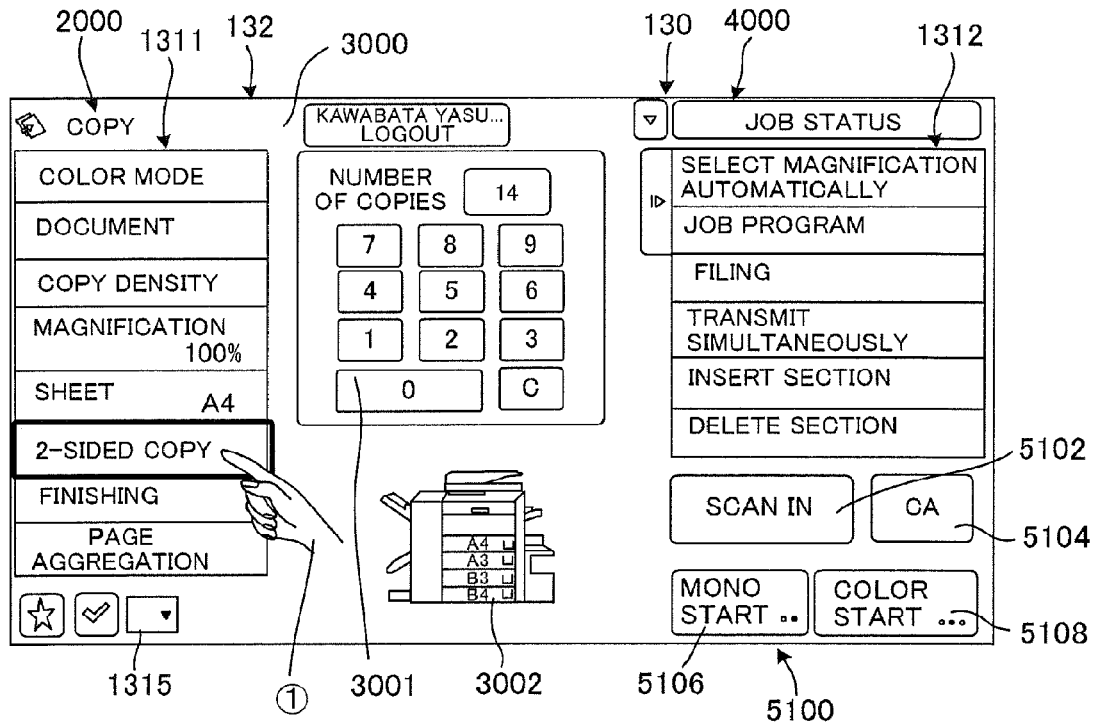
FIG. 24 is an explanatory view showing a display screen when 2-sided copy is selected in a copy mode of an image forming apparatus of a comparative example.
Figure 25:
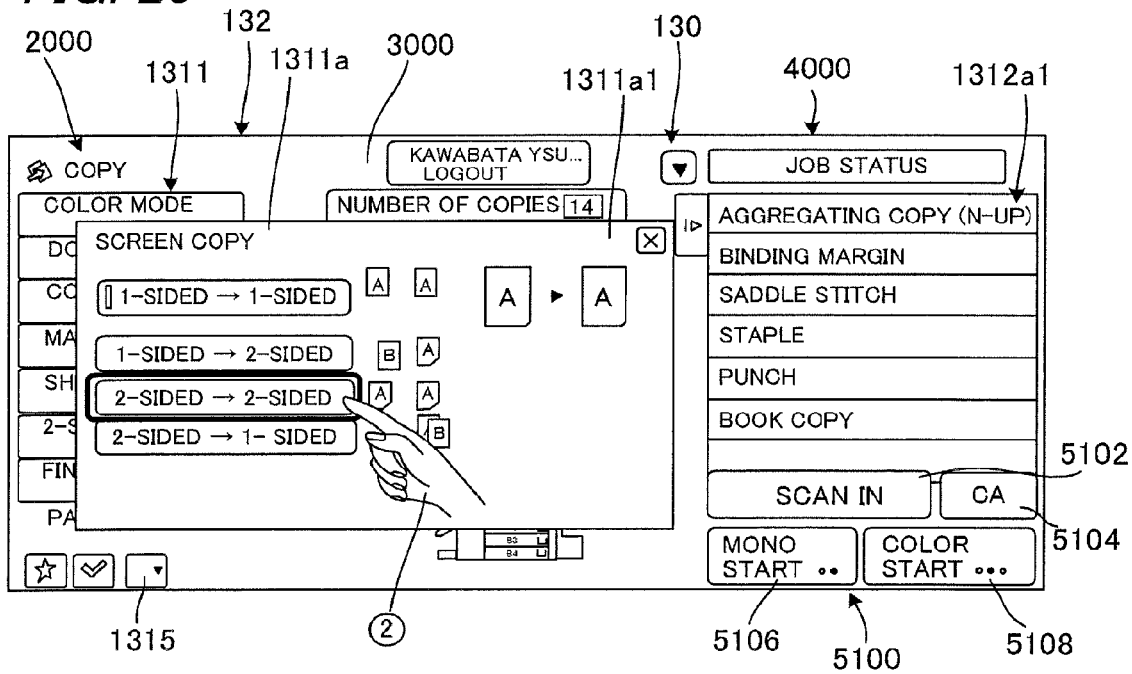
FIG. 25 is an explanatory view showing a state where a detail setting screen and a related function selection screen related to 2-sided copy are displayed after 2-sided copy is selected in the image forming apparatus.
Figure 26:
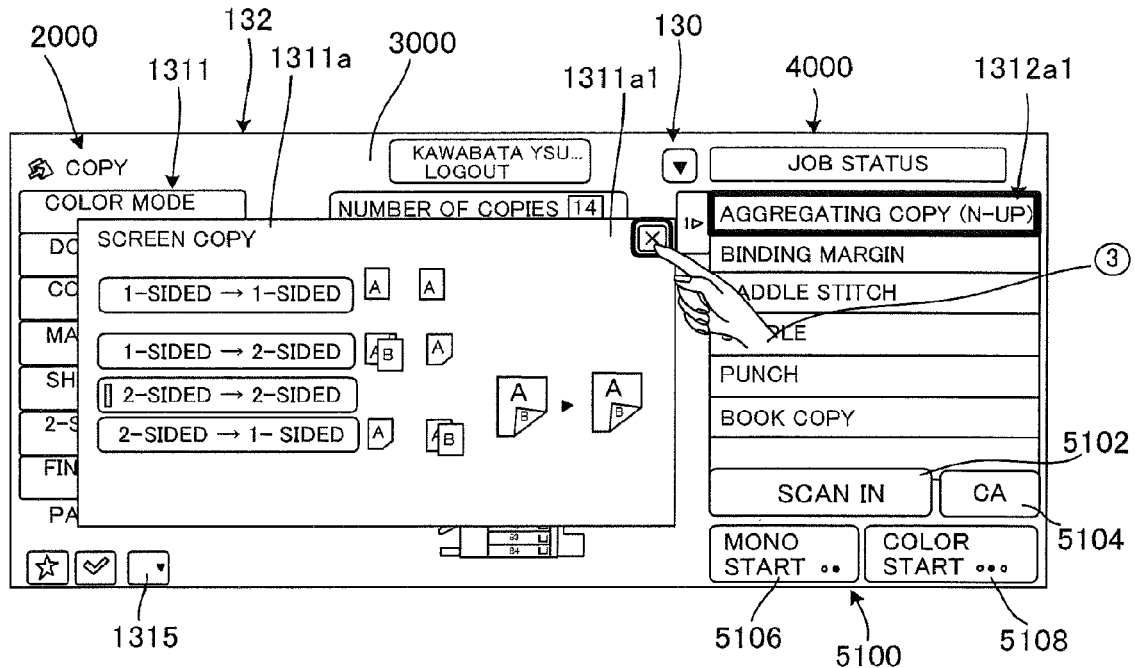
FIG. 26 is an explanatory view showing an operation of clearing the detail setting screen after setting is finished in the detail setting screen.
Figure 27:
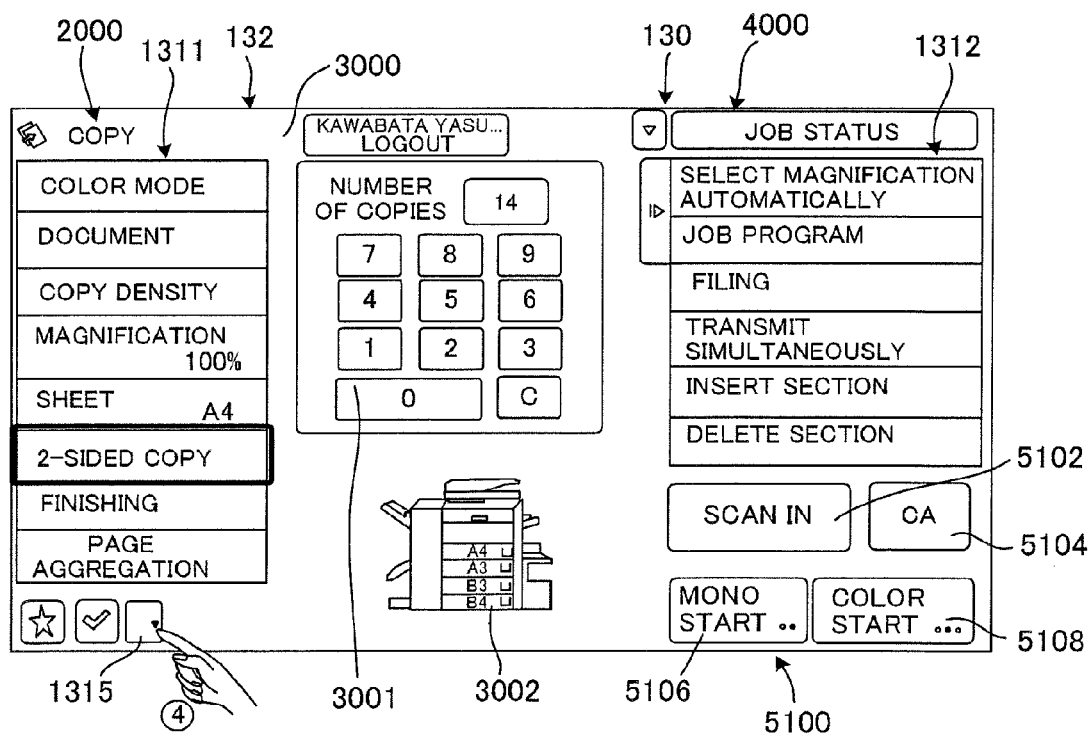
FIG. 27 is an explanatory view showing an operation of returning to a copy mode screen in the image forming apparatus to display the next operation screen.
Figure 30:
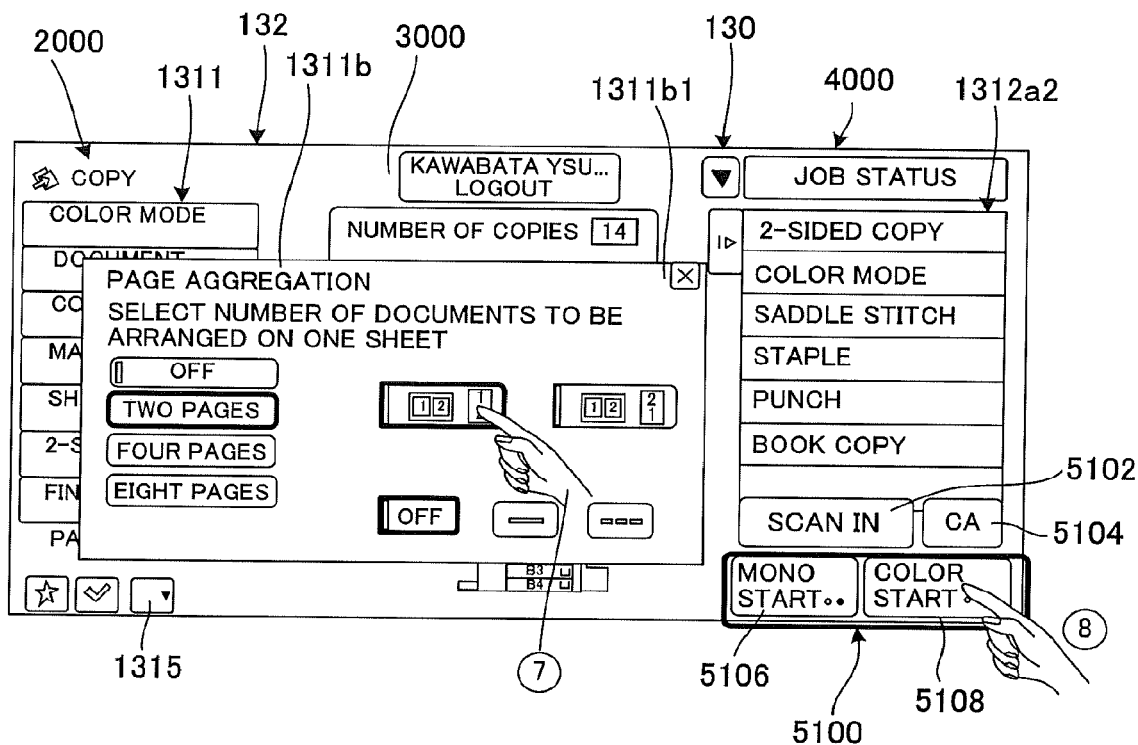
FIG. 30 is an explanatory view showing a state where, after an output form is selected in the detail setting screen related to aggregating copy, layouts of a finish image in accordance with the output form are displayed.

FIG. 24 is an explanatory view showing a display screen when 2-sided copy is selected in a copy mode of an image forming apparatus, FIG. 25 is an explanatory view showing a state where a detail setting screen and a related function selection screen related to 2-sided copy are displayed after 2-sided copy is selected in the image forming apparatus, FIG. 26 is an explanatory view showing an operation of clearing the detail setting screen after setting is finished on the detail setting screen, FIG. 27 is an explanatory view showing an operation of returning to a copy mode screen in the image forming apparatus to display the next operation screen, FIG. 28 is an explanatory view showing a state where a function setting screen is displayed on a display panel of the image forming apparatus, FIG. 29 is an explanatory view showing a state where a detail setting screen related to aggregating copy is displayed after aggregating copy is selected in the related function selection screen, and FIG. 30 is an explanatory view showing a state where, after an output form is selected in the detail setting screen related to aggregating copy, layouts of a finish image in accordance with an output form are displayed.

In the image forming apparatus 100, on the touch panel display 130, as shown in FIG. 24, the first function selecting portion 1311 on which functions related to the copy mode are displayed, is displayed on the function selection region 2000 arranged on the left side of the screen, while the second function selecting portion 1312 on which items of other functions which are selectable at the same time other than functions according to the first function selecting portion 1311 are displayed, is displayed on the action panel region 4000 arranged on the right side of the screen. On the preview region 3000 in the center part of the screen, the virtual numerical keypad 3001 and the mimic display 3002 picturing an entire apparatus are displayed on an initial screen.

In a case where 2-sided copy is made by a conventional method, when 2-sided copy is selected from selection items of the first function selecting portion 1311, the 2-sided copy function detail setting screen 1311a associated with functions related to the function of 2-sided copy is displayed so as to be overlaid in front of the function selection region 2000 and the preview region 3000 as shown in FIG. 25.

When a 2-sided document is output in 2-sided copying, "2-sided→2-sided" is selected on the 2-sided copy function detail setting screen 1311a as shown in FIG. 25. At this time, a finishing state of an image which is output is displayed for previewing on the preview region 1311a1 of the 2-sided copy function detail setting screen 1311a as shown in FIG. 26.

Next, when setting is made so as to aggregate pages for copying, the 2-sided copy function detail setting screen 1311a is cleared from the display panel 132 to select a special function key 1315 on a screen in the copy mode by a touch operation as shown in FIG. 27, and a function setting screen 1316 is displayed on the screen in the copy mode as shown in FIG. 28. The function setting screen 1316 includes selection items associated with other functions including "page aggregation".

When "page aggregation" is selected by a touch operation on the function setting screen 1316, the page aggregation function detail setting screen 1311b is displayed in front of the function selection region 2000 and the preview region 3000 as shown in FIG. 29.

When "two pages" is selected on the page aggregation function detail setting screen 1311b, a plurality of patterns of page layouts corresponding to the two pages (2 in 1) are displayed on the preview region 1311b1 of the page aggregation function detail setting screen 1311b as shown in FIG. 30.

A specific pattern is then selected from the plurality of page layouts and the color start key 5108 is operated by touch so that color copy is executed.

In this way, copying in the copy mode is set and executed.

As described above, in the example 2, the number of operations by a user from start of setting to outputting is six touch operations as shown in FIGS. 19 to 23. Whereas in the comparative example, the number of operations by a user from start of setting to outputting is eight touch operations as shown in FIGS. 24 to 30. Thus, according to the example 2, it is possible to make setting of image outputting efficiently by a simpler operation than ever before.

With the configuration described above, according to the present embodiment, in the image forming apparatus 100 provided with the operation unit 120 having a function of setting an image output condition of an image output based on input image data, as the configuration of the operation unit side control portion 131 for controlling processing and operations of the operation unit 120, the first function selecting portion 1311 (the 2-sided copy function detail setting screen 1311a and the page aggregation function detail setting screen 1311b) and the second function selecting portion 1312 (the first related function selection screen 1312a1 and the second related function selection screen 1312a2) are provided, and the first function selecting portion 1311 and the second function selecting portion 1312 are displayed at the same time on the touch panel display 130, so that functions selectable by the first function selecting portion 1311 and functions selectable by the second function selecting portion 1312 are selectable at the same time, and thereby, the presence of versatile convenient functions (recommended functions) provided in the apparatus is able to be confirmed and a function desired by a user is easily selectable from among these functions, thus making it possible to make setting of image outputting efficiently with a simpler operation than ever before. This makes it possible to realize the image forming apparatus capable of reducing erroneous copy due to an erroneous operation and trying to improve operability.

That is, in the present embodiment, the second function selecting portion 1312 is displayed corresponding to the first function selecting portion 1311, and the first related function selection screen 1312a1 related to the 2-sided copy function detail setting screen 1311a is displayed when the 2-sided copy function detail setting screen 1311a is displayed corresponding to the function of the first function selecting portion 1311, further, the second related function selection screen 1312a2 related to the page aggregation function detail setting screen 1311b is displayed when the page aggregation function detail setting screen 1311b is displayed corresponding to the function of the 2-sided copy function detail setting screen 1311a, so that detail setting of the selected function is able to be confirmed and selected easily as well as functions related to the selected function are able to be confirmed and selected easily. This makes it possible to reduce switching of the operation screen, thus making it possible to select and set functions efficiently with an erroneous operation reduced.

Note that, in the above embodiments and examples, description has been given for an example in which the operation unit 120 according to the present invention is applied to the image forming apparatus 100 as shown in FIG. 1, but not limited to an image forming apparatus or a copier with a configuration as described above as far as it is an image forming apparatus provided with the operation unit (image display operation device) provided with the function selection screen (function selecting portion) associated with a plurality of functions so as to be executable and having a function of setting an image output condition of an output image, and is able to be developed to other image forming apparatuses and the like.

As has been described, the present invention is not limited to the above embodiments and examples, and various modifications can be made within the range specified in the scope of claims. It is obvious that various changes and modifications will occur to those skilled in the art within the scope of claims, that is, any embodiment obtained by combination of technical parts modified as appropriate without departing from the scope of the present invention should be included in the technical range of the present invention.

What is claimed is:

1. An image display operation device comprising:
a function selecting portion to correlate with a plurality of functions so as to be executable;
a display portion to display the function selecting portion; and
a display control portion having a function of causing the display portion to display the function selecting portion,
wherein the function selecting portion comprises:
a first function selecting portion in which selectable function items are displayed; and
a second function selecting portion in which other function items that are selectable in conjunction with functions included in the first function selecting portion are displayed, and
when one or more functions included in the first function selecting portion are selected, the display control portion changes function items to be displayed on the second function selecting portion, based on contents of the one or more functions selected on the first function selecting portion.

2. The image display operation device according to claim 1, wherein the second function selecting portion is correlated with functions related to the functions included in the first function selecting portion so as to be executable, and
when the one or more functions included in the first function selecting portion are selected, the display control portion displays function items related to the one or more functions selected on the first function selecting portion, as the function items to be displayed on the second function selecting portion.

3. The image display operation device according to claim 2, wherein the function items related to the functions included in the first function selecting portion includes at least one, among functions assumed to be frequently used, functions which are convenient when used jointly, recommended functions, functions being highly mechanically related, new functions and functions for being able to cause turning on/off with a touch operation.

4. The image display operation device according to claim 1, wherein the first function selecting portion further comprises a detail setting portion associated with functions related to respective functions of the first function selecting portion so as to be executable, and
when a specific function is selected in the first function selecting portion, the display control portion displays the detail setting portion associated with the specific function on the display portion.

5. The image display operation device according to claim 4, wherein the second function selecting portion further comprises a related function selecting portion associated with functions related to respective functions of the detail setting portion so as to be executable, and
when a specific function is selected in the detail setting portion, the display control portion switches the second function selecting portion to the related function selecting portion associated with the specific function for displaying.

6. The image display operation device according to claim 5, wherein when a specific function is selected in the related function selecting portion, the display control portion displays the detail setting portion associated with the specific function on the display portion.

7. The image display operation device according to claim 1, wherein the first function selecting portion is associated with functions of setting finishing processing so as to be executable, and the display control portion is provided with a finishing state display portion to display a finishing state of an image based on the functions of setting the finishing processing and include a function of displaying the finishing state of the image by the finishing state display portion as well as displaying the second function selecting portion.

8. The image display operation device according to claim 7, wherein the second function selecting portion is associated with functions related to the functions of setting the finishing processing so as to be executable, and the display control portion reflects processing based on a function selected from the functions related to the functions of setting the finishing processing in the second function selecting portion to an image displayed by the finishing state display portion.

9. The image display operation device according to claim 7, wherein the function selecting portion comprises an image output instructing portion associated with functions of instructing image output so as to be executable, and when a the finishing state of an the image is displayed by the finishing state display portion, the display control portion displays the image output instructing portion in a close vicinity of the second function selecting portion.

10. An image forming apparatus comprising:
the image display control device according to claim 1; and,
an image forming portion configured to form an image on a recording medium.

11. An image display operation method comprising:
a step of displaying a function selecting portion to correlate with a plurality of functions so as to be executable, on a display portion,
wherein the function selecting portion comprises:
a first function selecting portion in which selectable function items are displayed; and
a second function selecting portion in which other function items that are selectable in conjunction with functions included in the first function selecting portion are displayed,
the image display operation method further comprising:
a step of, when one or more functions included in the first function selecting portion are selected, changing function items to be displayed on the second function selecting portion, based on contents of the one or more functions selected on the first function selecting portion.

* * * * *